United States Patent
Kondo et al.

(10) Patent No.: US 8,169,490 B2
(45) Date of Patent: May 1, 2012

(54) IMAGE PROCESSING APPARATUS, IMAGE PROCESSING METHOD, AND PROGRAM

(75) Inventors: Yuhi Kondo, Tokyo (JP); Takefumi Nagumo, Kanagawa (JP); Jun Luo, Tokyo (JP)

(73) Assignee: Sony Corporation, Tokyo (JP)

( * ) Notice: Subject to any disclaimer, the term of this patent is extended or adjusted under 35 U.S.C. 154(b) by 293 days.

(21) Appl. No.: 12/645,211

(22) Filed: Dec. 22, 2009

(65) Prior Publication Data

US 2010/0157073 A1    Jun. 24, 2010

(30) Foreign Application Priority Data

Dec. 22, 2008 (JP) ................. P2008-325422

(51) Int. Cl.
*H04N 5/225* (2006.01)
(52) U.S. Cl. .................. 348/208.6; 348/208.1
(58) Field of Classification Search ............. 348/208.99, 348/208.1, 208.4, 208.6
See application file for complete search history.

(56) References Cited

U.S. PATENT DOCUMENTS

| | | | |
|---|---|---|---|
| 2005/0163348 A1* | 7/2005 | Chen .................. | 348/208.99 |
| 2006/0017814 A1* | 1/2006 | Pinto et al. .......... | 348/208.4 |
| 2008/0175519 A1* | 7/2008 | Nagumo .............. | 382/299 |
| 2009/0092337 A1* | 4/2009 | Nagumo .............. | 382/299 |
| 2009/0207260 A1* | 8/2009 | Furukawa ............ | 348/208.4 |
| 2010/0208086 A1* | 8/2010 | Kothandaraman et al. ......... | 348/208.4 |

FOREIGN PATENT DOCUMENTS

| | | |
|---|---|---|
| JP | 9-261526 | 10/1997 |
| JP | 11-75105 | 3/1999 |

* cited by examiner

*Primary Examiner* — Jason Whipkey
(74) *Attorney, Agent, or Firm* — Finnegan, Henderson, Farabow, Garrett & Dunner LLP

(57) ABSTRACT

An image processing apparatus includes a motion prediction processor configured to detect a motion vector that indicates inter-image motion between a current image and a reference image; a motion compensation processor configured to perform a motion compensation process for the reference image by using the motion vector and generate a motion compensated image; an addition processor configured to generate a noise reduced image in which noise of the current image is reduced by adding the current image and the motion compensated image; an addition determination unit configured to compute an addition weight in units of pixels of the motion compensated image; a down-sampling processor configured to perform a process for reducing the current image and the motion compensated image; and an up-sampling processor configured to perform a process for expanding an addition coefficient map that is an output of the addition determination unit.

4 Claims, 24 Drawing Sheets

FIG. 11

| | |
|---|---|
| AVERAGING TECHNIQUE | REDUCTION RATIO IS DETERMINED, AND AMOUNT OF AVERAGE FEATURE IN AREA TO BE REDUCED IS USED. AS A RESULT, PIXELS CONTAINING NOISE ARE SMOOTHED, AND INFLUENCE OF NOISE IS DECREASED. |
| LPF APPLICATION TECHNIQUE | PIXELS NOT ONLY IN AREA TO BE REDUCED, BUT ALSO PIXELS IN THE PERIPHERY IN ACCORDANCE WITH SIZE OF WINDOW OF FILTER ARE SMOOTHED. THE AMOUNT OF NOISE IS REDUCED SIMILARLY TO AVERAGING. |
| SUB-SAMPLIMG TECHNIQUE | VALUE OF ONE POINT OR AVERAGE OR MEDIAN VALUE OF SEVERAL POINTS IN REDUCED AREA IS USED AS VALUE OF THE REDUCED AREA. SINCE ONLY SEVERAL POINTS IN REDUCED AREA ARE USED, THE NUMBER OF CALCULATIONS IS GREATLY REDUCED. |
| MEDIAN VALUE APPLICATION TECHNIQUE | MEDIAN VALUE IN REDUCED AREA OR BLOCK IS USED. THIS IS EFFECTIVE VALUE EVEN IF SEVERAL PIXEL VALUES ARE GREATLY APART FROM OTHER PIXEL VALUES DUE TO IMPULSE NOISE. |

FIG. 12

| | |
|---|---|
| NEAREST NEIGHBOR METHOD | VALUE OF NEAREST PIXEL WHEN IMAGE IS EXPANDED IS COPIED AND USED. |
| BI-LINEAR METHOD | 4 PERIPHERAL PIXELS ARE SAMPLED AND USED BY PERFORMING LINEAR INTERPOLATION THEREON. |
| BI-CUBIC METHOD | WEIGHTING IS PERFORMED ON A PLURALITY OF PIXELS AT NEAR POINTS IN ACCORDANCE WITH DISTANCE FROM OBJECT PIXEL, AND FILTERING IS PERFORMED. |
| LINEAR INTERPOLATION AND LPF APPLICATION PROCESS | LINEAR INTERPOLATION IS PERFORMED BY SETTING EXPANSION PIXEL TO 0, AND SIGNAL IS PASSED THROUGH LOW-PASS FILTER (LPF) IN WHICH NYQUIST FREQUENCY IS USED AS CUT-OFF FREQUENCY. |
| TECHNIQUE IN WHICH MAXIMUM VALUE AND MINIMUM VALUE OF FIXED AREA ARE USED | ADDITION COEFFICIENT MAP INDICATING ADDITION WEIGHT IN EACH PIXEL IS OUTPUT. THEREFORE, WHEN UP-SAMPLING IS PERFORMED BY USING MAXIMUM VALUE OF CERTAIN AREA AS PIXEL VALUE OF THAT AREA, MC IMAGE IS UNNECESSARILY ADDED. WHEN MINIMUM VALUE IS USED, CURRENT IMAGE IS UNNECESSARILY ADDED IN REVERSE MANNER. |

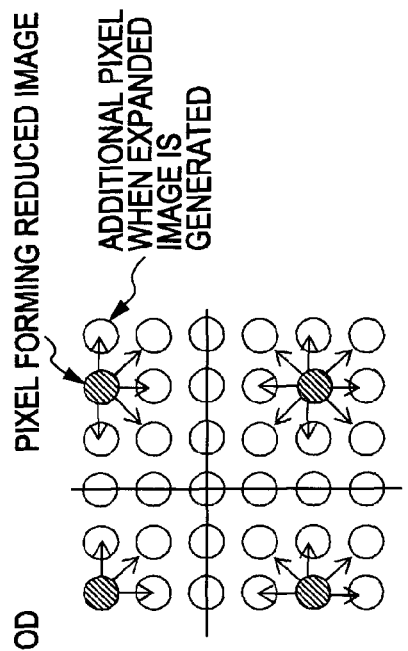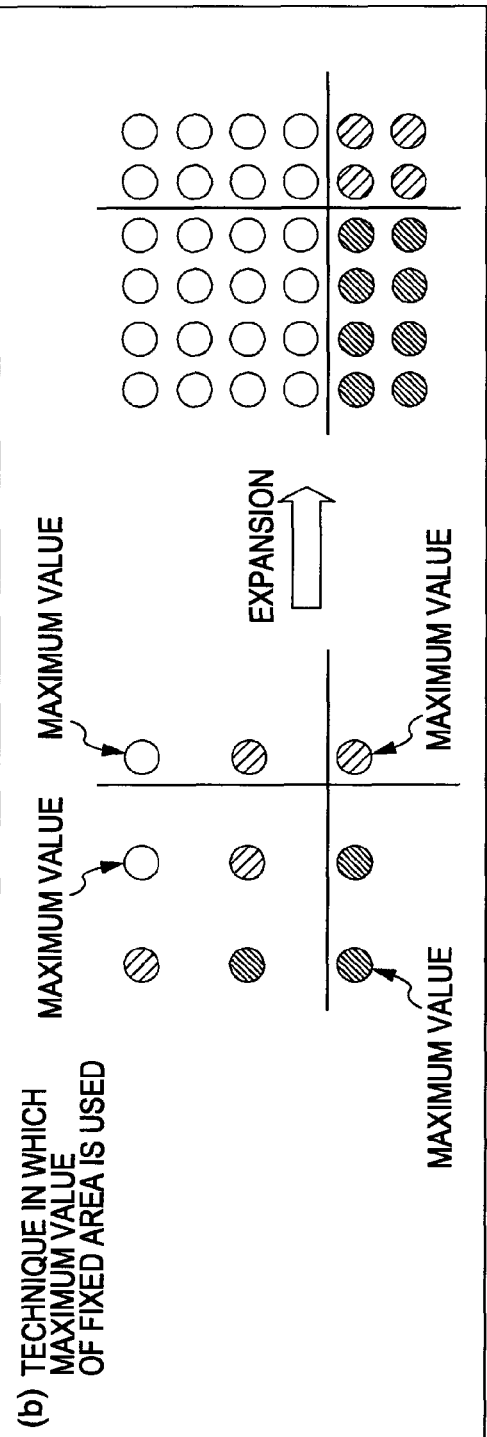
FIG. 13

IMAGE PROCESSING APPARATUS, IMAGE PROCESSING METHOD, AND PROGRAM

BACKGROUND OF THE INVENTION

1. Field of the Invention

The present invention relates to an image processing apparatus, an image processing method, and a program. More particularly, the present invention relates to an image processing apparatus, an image processing method, and a program that perform a process for generating a motion compensated image and reducing noise in images.

2. Description of the Related Art

Images captured using, for example, cameras, video imaging devices, or the like contain a not insignificant amount of noise. Often, much noise is contained in captured images in, in particular, image capturing at a low illumination or in a short exposure time period. One of the causes for this is that in a case where image capturing at a low illumination or for a short exposure time period is performed, the amount of incident light is small and the amount of stored charge of image-capturing elements is decreased. In order to obtain a bright image on the basis of such image-captured data, amplification of a signal becomes necessary. During this amplification process, noise that occurs in image-capturing elements and/or analog circuits is amplified, and a resulting image is an image having much noise.

In order to decrease noise, exposure for a long time period is effective, but if exposure for a long time period is performed, there is a possibility that blurring of an image due to camera shake during exposure occurs. Another method is available in which continuous image capturing is performed in which image capturing is repeated at a high shutter speed at which exposure blurring hardly occurs, and a plurality of images obtained by the continuous image capturing are addition-averaged, thereby reducing noise that is not correlated with respect to the time direction. However, this process for adding a plurality of images takes many calculations, thereby decreasing processing efficiency.

Techniques for reducing noise of an image according to examples of the related art are, for example, disclosed in the following documents.

Japanese Unexamined Patent Application Publication No. 9-261526 discloses a configuration in which camera shake of a plurality of images obtained by continuous image capturing is corrected, and these images are superposed.

Japanese Unexamined Patent Application Publication No. 11-75105 discloses a configuration in which the total exposure time period is divided into a plurality of exposure periods, and images obtained in respective exposure periods are subjected to shake correction and added together, thereby realizing improvement in the image quality.

In both the configurations disclosed in Japanese Unexamined Patent Application Publication Nos. 9-261526 and 11-75105, a motion vector is detected from a plurality of images so as to obtain motion information among a plurality of images, and images are combined by using the motion information. However, as described above, a process for adding images takes many calculations, and thus the processing efficiency is decreased.

SUMMARY OF THE INVENTION

It is desirable to provide an image processing apparatus, an image processing method, and a program that reduce a processing load in a process for adding images so as to make a high-speed process possible and that generate high-quality noise reduced images by computing an addition weight with high accuracy in a configuration in which a plurality of images are combined to generate a noise reduced image.

According to an embodiment of the present invention, there is provided an image processing apparatus including: a motion prediction processor configured to detect a motion vector that indicates inter-image motion between a current image and a reference image; a motion compensation processor configured to perform a motion compensation process for the reference image by using the motion vector and generate a motion compensated image; an addition processor configured to generate a noise reduced image in which noise of the current image is reduced by performing a process for adding the current image and the motion compensated image; an addition determination unit configured to compute an addition weight in units of pixels of the motion compensated image that is used for a process for adding the current image and the motion compensated image, the addition process being performed by the addition processor; a down-sampling processor configured to perform a process for reducing the current image and the motion compensated image that are input to the addition determination unit; and an up-sampling processor configured to perform a process for expanding an addition coefficient map that is an output of the addition determination unit.

In the image processing apparatus according to the embodiment of the present invention, the addition determination unit may compute an addition weight corresponding to constituent pixels of the reduced image by using reduced images of the current image and the motion compensated image generated by the down-sampling processor.

According to another embodiment of the present invention, there is provided an image processing apparatus including: a motion prediction processor configured to detect a motion vector that indicates inter-image motion between a current image and a reference image; a motion compensation processor configured to perform a motion compensation process for the reference image by using the motion vector and generate a motion compensated image; an addition processor configured to generate a noise reduced image in which noise of the current image is reduced by performing a process for adding the current image and the motion compensated image; and an addition determination unit configured to compute an addition weight in units of pixels of the motion compensated image that is used for a process for adding the current image and the motion compensated image, the addition process being performed by the addition processor, wherein the addition determination unit includes an area determination unit configured to perform analysis of the current image and the motion compensated image and determine an area attribute as to which one of (a) motion estimation success area, (b) motion estimation failure area, and (c) detailed confirmation necessity area that is neither one of (a) and (b) each of small areas in which the motion compensated image is divided corresponds to, and an addition weight setting unit configured to perform a process for computing an addition weight different according to the area attribute that is a determination result of the area determination unit, the addition weight belonging to each area.

In the image processing apparatus according to the embodiment of the present invention, when the small area is a motion estimation success area, the addition weight setting unit may perform a process for setting an addition weight corresponding to a pixel contained in the small area to 1, and when the small area is a motion estimation failure area, the addition weight setting unit may perform a process for setting an addition weight corresponding to a pixel contained in the small area to 0.

In the image processing apparatus according to the embodiment of the present invention, when the small area is neither one of the motion estimation success area and the motion estimation failure area, the addition weight setting unit may compute an addition weight corresponding to each pixel by analyzing information containing difference information on corresponding pixels of the current image and the motion compensated image in units of pixels contained in the area.

In the image processing apparatus according to the embodiment of the present invention, the area determination unit may compute at least one of a variance value, an average value, a median value, a mode value, a maximum value, and a minimum value corresponding to difference values of corresponding pixels of the current image and the motion compensated image, and may perform an area determination process by comparing one of the computed values with a preset threshold value.

In the image processing apparatus according to the embodiment of the present invention, the area determination unit may perform a process for computing a normalization correlation between the current image and the motion compensated image and may perform an area determination process by comparing the normalization correlation with a preset threshold value.

In the image processing apparatus according to the embodiment of the present invention, the addition determination unit may further include a noise determination table generator configured to generate a noise determination table in which estimated amounts of noise corresponding to pixel values are changed in accordance with the area attribute that is a determination result of the area determination unit, and the addition weight setting unit may perform a process of setting an addition weight different according to the area attribute, the addition weight corresponding to a pixel belonging to each area, by using the amount of noise estimated using the noise determination table.

In the image processing apparatus according to the embodiment of the present invention, the addition determination unit may further include an addition weight correction value computation unit configured to compute an addition weight correction value in accordance with the area attribute that is a determination result of the area determination unit, a computation unit configured to perform a computation process for the value of the addition weight corresponding to the pixel, which is computed by the addition weight setting unit, and the addition weight correction value computed by the addition weight correction value computation unit, and an addition weight adjustment unit configured to adjust an output of the computation unit to a range of 0 to 1.

In the image processing apparatus according to the embodiment of the present invention, the addition determination unit may compute an addition weight corresponding to constituent pixels of reduced images of the current image and the motion compensated image generated by a down-sampling processor.

According to another embodiment of the present invention, there is provided an image processing method for use with an image processing apparatus configured to generate a noise reduced image, the image processing method including the steps of: detecting, by using a motion prediction processor, a motion vector that indicates inter-image motion between a current image and a reference image; performing, by using a motion compensation processor, a motion compensation process for the reference image by using the motion vector and generating a motion compensated image; generating, by using an addition processor, a noise reduced image in which noise of the current image is reduced by performing a process for adding the current image and the motion compensated image; computing, by using an addition determination unit, an addition weight in units of pixels of the motion compensated image that is used for a process for adding the current image and the motion compensated image, the addition process being performed by the addition processor; performing, by using a down-sampling processor, a process for reducing the current image and the motion compensated image that are input to the addition determination unit; and performing, by using an up-sampling processor, a process for expanding an addition coefficient map that is an output of the addition determination unit.

According to another embodiment of the present invention, there is provided an image processing method for use with an image processing apparatus configured to generate a noise reduced image, the image processing method including the steps of: detecting, by using a motion prediction processor, a motion vector that indicates inter-image motion between a current image and a reference image; performing, by using a motion compensation processor, a motion compensation process for the reference image by using the motion vector and generating a motion compensated image; generating, by using an addition processor, a noise reduced image in which noise of the current image is reduced by performing a process for adding the current image and the motion compensated image; and computing, by using an addition determination unit, an addition weight in units of pixels of the motion compensated image that is used for a process for adding the current image and the motion compensated image, the addition process being performed by the addition processor, wherein the addition determination step includes the steps of performing analysis of the current image and the motion compensated image and determining an area attribute as to which one of (a) motion estimation success area, (b) motion estimation failure area, and (c) detailed confirmation necessity area that is neither one of (a) and (b) each of small areas in which the motion compensated image is divided corresponds to, and performing a process for computing an addition weight belonging to each area, a different process being used in accordance with an area attribute that is a determination result in the area determination step.

According to another embodiment of the present invention, there is provided a program for causing an image processing apparatus to execute image processing including the steps of: causing a motion prediction processor to detect a motion vector that indicates inter-image motion between a current image and a reference image; causing a motion compensation processor to perform a motion compensation process for the reference image by using the motion vector and generate a motion compensated image; causing an addition processor to generate a noise reduced image in which noise of the current image is reduced by performing a process for adding the current image and the motion compensated image; causing an addition determination unit to compute an addition weight in units of pixels of the motion compensated image that is used for a process for adding the current image and the motion compensated image, the addition process being performed by the addition processor; causing a down-sampling processor to perform a process for reducing the current image and the motion compensated image that are input to the addition determination unit; and causing an up-sampling processor to perform a process for expanding an addition coefficient map that is an output of the addition determination unit.

According to another embodiment of the present invention, there is provided a program for causing an image processing apparatus to execute image processing including the steps of: causing a motion prediction processor to detect a motion vector that indicates inter-image motion between a current image and a reference image; causing a motion compensation processor to perform a motion compensation process for the reference image by using the motion vector and generate a motion compensated image; causing an addition processor to generate a noise reduced image in which noise of the current image is reduced by performing a process for adding the current image and the motion compensated image; and causing an addition determination unit to compute an addition weight in units of pixels of the motion compensated image that is used for a process for adding the current image and the motion compensated image, the addition process being performed by the addition processor, wherein the addition determination step includes the steps of performing analysis of the current image and the motion compensated image and determining an area attribute as to which one of (a) motion estimation success area, (b) motion estimation failure area, and (c) detailed confirmation necessity area that is neither one of (a) and (b) each of small areas in which the motion compensated image is divided corresponds to, and performing a process for computing an addition weight belonging to each area, a different process being used in accordance with an area attribute that is a determination result in the area determination step.

A program according to an embodiment of the present invention is, for example, a program that can be provided to a general-purpose system capable of executing various program codes, the program being provided in the form of a storage medium and a communication medium provided in a computer-readable format. By providing such a program in a computer-readable format, processing in accordance with the program is realized on the computer system.

Further objects, features, and advantageous effects of the present invention will become apparent from the following detailed description of embodiments of the present invention and drawings attached thereto. Note that the system in the present specification refers to a logical assembly of a plurality of apparatuses and is not limited to an assembly in which apparatuses having individual structures are contained in a single housing.

According to the configuration of an embodiment of the present invention, on the basis of a current image and a reference image, by applying a motion vector indicating a motion between images, motion compensation of the reference image is performed to generate a motion compensated image. By applying the addition weight of the motion compensated image computed by the addition determination unit, the current image and the motion compensated image are added to generate a noise reduced image. In this configuration, the addition determination unit receives reduced images of the current image and the motion compensated image and performs addition weight computation. Furthermore, the addition determination unit determines the success or failure of the motion estimation of the motion compensated image in units of small areas, and adjusts the addition weight in accordance with the success or failure of the motion estimation. With these configurations, higher efficiency of an addition determination process and higher accuracy of an addition weight are achieved, and a noise reduced image with high quality is realized.

BRIEF DESCRIPTION OF THE DRAWINGS

FIG. 11 illustrates down-sampling processing examples performed by an image processing apparatus according to an embodiment of the present invention;

FIG. 12 illustrates up-sampling processing examples performed by an image processing apparatus according to an embodiment of the present invention;

FIG. 13 illustrates examples of up-sampling processes performed by an image processing apparatus according to an embodiment of the present invention;

DESCRIPTION OF THE PREFERRED EMBODIMENTS

The details of an image processing apparatus, an image processing method, and a program according to embodiments of the present invention will be described below with reference to the drawings. Hereinafter, a description will be given in order in accordance with the items described below.

(1) Basic Configuration of Image Processing Apparatus (1a) Configuration and processing of image processing apparatus that generates noise reduced image (1b) Configuration and processing of addition determination unit and addition processor (2) Image Processing Apparatus capable of High-Speed Processing and Generating High-Accuracy Noise Reduced Image (2a) Image processing apparatus (first embodiment) that performs addition determination process using reduced image (2b) Image processing apparatus (second embodiment) that performs addition determination process using success determination information on motion estimation (ME)

Figure 1:
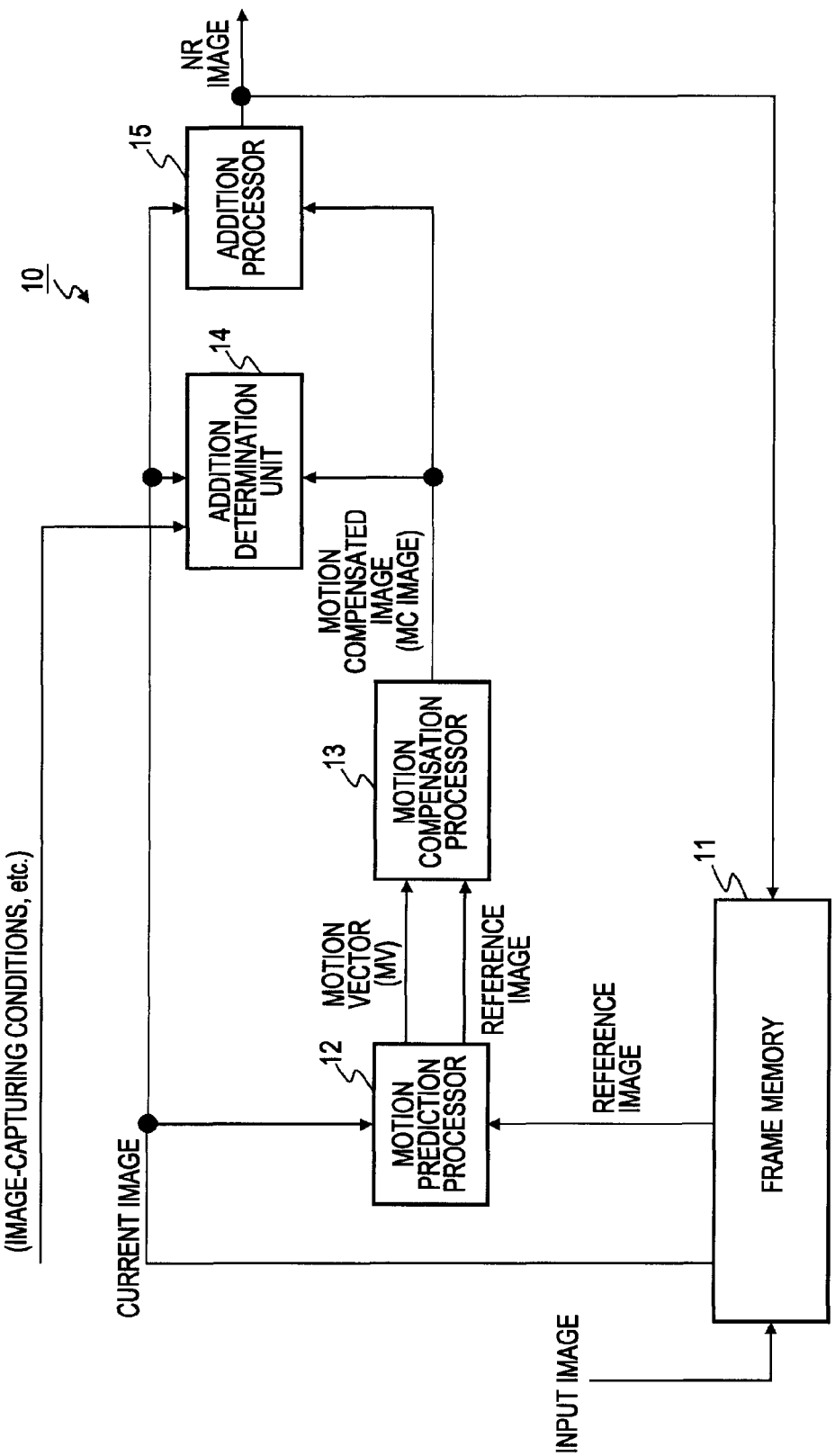
FIG. 1 illustrates an example of the configuration of an image processing apparatus that performs a process for generating a noise reduced image.

(2c) Image processing apparatus (third embodiment) that performs addition determination process using discrimination information between noise and motion estimation (ME) failure area (2c-1) Example of using noise determination table in accordance with area determination result (2c-2) Example of configuration that performs process for correcting addition weight in accordance with area determination result (3) Example of Configuration of Hardware of Image Processing Apparatus (1) Basic Configuration of Image Processing Apparatus (1a) Configuration and Processing of Image Processing Apparatus that Generates Noise Reduced Image First, the basic configuration of an image processing apparatus that generates a noise reduced image will be described below with reference to FIG. 1 and subsequent figures. FIG. 1 shows the configuration of an image processing apparatus that performs a noise reduced image generation process by using an image combining process using a plurality of images. The image processing apparatus shown in FIG. 1 has approximately the same configuration as the image processing apparatus disclosed in earlier Japanese Patent Application No. 2007-136184 of the same applicant as the present applicant. The present invention is based on the configuration of the image processing apparatus disclosed in earlier Japanese Patent Application No. 2007-136184) so as to make improvements, thereby realizing high-speed processing and high-accuracy processing. An embodiment of the image processing apparatus according to the present invention will be described in item (2) and subsequent items. First, the configuration and the processing of the image processing apparatus as a basis therefor will be described in item (1).

An image processing apparatus 10 shown in FIG. 1 can be a single image processing apparatus. Alternatively, it can also be one component inside, for example, a camera, a PC, or an image display device.

In the following, a description will be given by assuming that the image processing apparatus 10 shown in FIG. 1 is provided inside a camera, images that are continuously captured are sequentially stored as input images for a frame memory 11. The image processing apparatus 10 includes a frame memory 11, a motion prediction processor 12, a motion compensation processor 13, an addition determination unit 14, and an addition processor 15. In the frame memory 11, captured images are sequentially stored as input images.

An input image is an image containing noise. The image processing apparatus 10 shown in FIG. 1 performs noise reduction from the input image, and finally outputs a noise reduced image (NR image) as an output of the addition processor 15 shown in FIG. 1.

A current image and a reference image are input to the motion prediction processor 12 from the frame memory 11. The current image is an image for which a noise reduction process is performed, and the reference image is an image used for a noise reduction process on the current image. For example, a motion vector is obtained from the current image and the reference image. The noise reduction process for the current image is performed by using a plurality of continuously captured reference images.

A noise reduced image that is generated by using, for example, one current image and one reference image is stored again in the frame memory 11. By using the next second reference image using this noise reduced image as a new current image, a further noise reduction process is performed. A specific processing example will be described later with reference to FIG. 2.

The motion prediction processor 12 computes a motion vector by using a current image and a reference image from the frame memory 11. Positioning between a block of the reference image and the corresponding block of the current image is performed in units of small areas (blocks) in which, for example, one image frame is divided, and a motion vector MV in units of blocks is output. The motion vector MV is a vector that indicates a motion of images between the current image and the reference image. The motion vector can be set as a vector containing information on not only parallel movement but also expansion and contraction, rotation, and the like.

In the detection of the motion vector MV, for example, a block matching method can be used. The block matching method is a process in which a small area (block) is further divided into very small blocks, and the absolute difference value (SAD: Sum of Absolute Difference) of the pixel value of each very small block of the current image and the reference image is computed, so that a set of very small blocks in which the absolute difference value (SAD) is small is estimated to contain corresponding blocks. A vector that connects the corresponding blocks of two images can be determined as a motion vector.

The motion compensation processor 13 performs motion compensation on the current image or the reference image by using the motion vector MV generated by the motion prediction processor 12 so as to generate a motion compensated image (MC image). That is, a motion compensated image (MC image) such that the current image or the reference image is moved so as to cause the subject position of the current image to match the subject position of the reference image is generated. The motion compensated image (MC image) generated by the motion compensation processor 13 is supplied to the addition determination unit 14 and the addition processor 15.

The addition determination unit 14 receives the motion compensated image (MC image) generated by the motion compensation processor 13, the current image, and image information (image-capturing conditions, etc.) used for estimating the amount of noise. The image information is supplied from, for example, a microcomputer inside a camera. The image information contains information, such as an image-capturing mode corresponding to the input image (captured image), the exposure time period, the gain, and the like.

The addition determination unit 14 generates, in units of pixels, an addition weight used by the addition processor 15. The addition weight represents the reliability of addition. That is, the correctness of the motion compensation is determined between the current image and the motion compensated image (MC image), so that a pixel in which noise is reduced without causing deterioration when the current image and the motion compensated image (MC image) are added is set to have a high reliability.

That is, the addition determination unit 14 determines the correctness of the motion compensation performed between the current image and the motion compensated image (MC image), and computes an addition weight in which the addition ratio of the motion compensated image (MC image) is increased by setting the reliability of the pixel in which the motion compensation is correct to be high. The addition determination unit 14 determines the addition weight in units of pixels of the motion compensated image (MC image).

For example, if an addition process is performed between pixels in which the same portion of the same object body of two images is captured at different times, noise that is not correlated to time as a result of addition can be reduced. As described above, the higher the certainty factor corresponding to the same portion of the same object body in two images, the higher the reliability is. The reliability, in other words, represents whether noise is superposed on the same image or whether noise is superposed on a different image. It is necessary for a high-precision noise reduction process that an addition weight is formed in correspondence with only the amount of noise to the greatest extent possible. The addition weight generated by the addition determination unit 14 is set to have, for example, a value of 0 when the reliability is low and a value of 1 when the reliability is high.

The addition processor 15 performs a process for adding the current image and the motion compensated image (MC image) by using an addition weight calculated for each of the corresponding pixels. The addition processor 15 calculates a weighted average between the current image and the motion compensated image (MC image) so as to perform an addition process. The weight of the weighted average is a value such that a feedback factor is multiplied by the addition weight. For example, if the feedback factor is set to ⅓, when the addition weight is changed from 0 to 1, the weight for the MC image in the weighted average is changed from 0 to ⅓.

The result of the addition of the current image and the motion compensated image (MC image) that are generated by the addition processor 15 is stored in the frame memory 11. This image is used as a new current image and is combined with a new reference image, and the same processing as the above-described processing is repeatedly performed. For example, after a pre-specified number of processes is repeated, the result of the addition of the current image and the motion compensated image (MC image) that are generated by the addition processor 15 is output as a noise reduced image (NR image).

Figure 2:
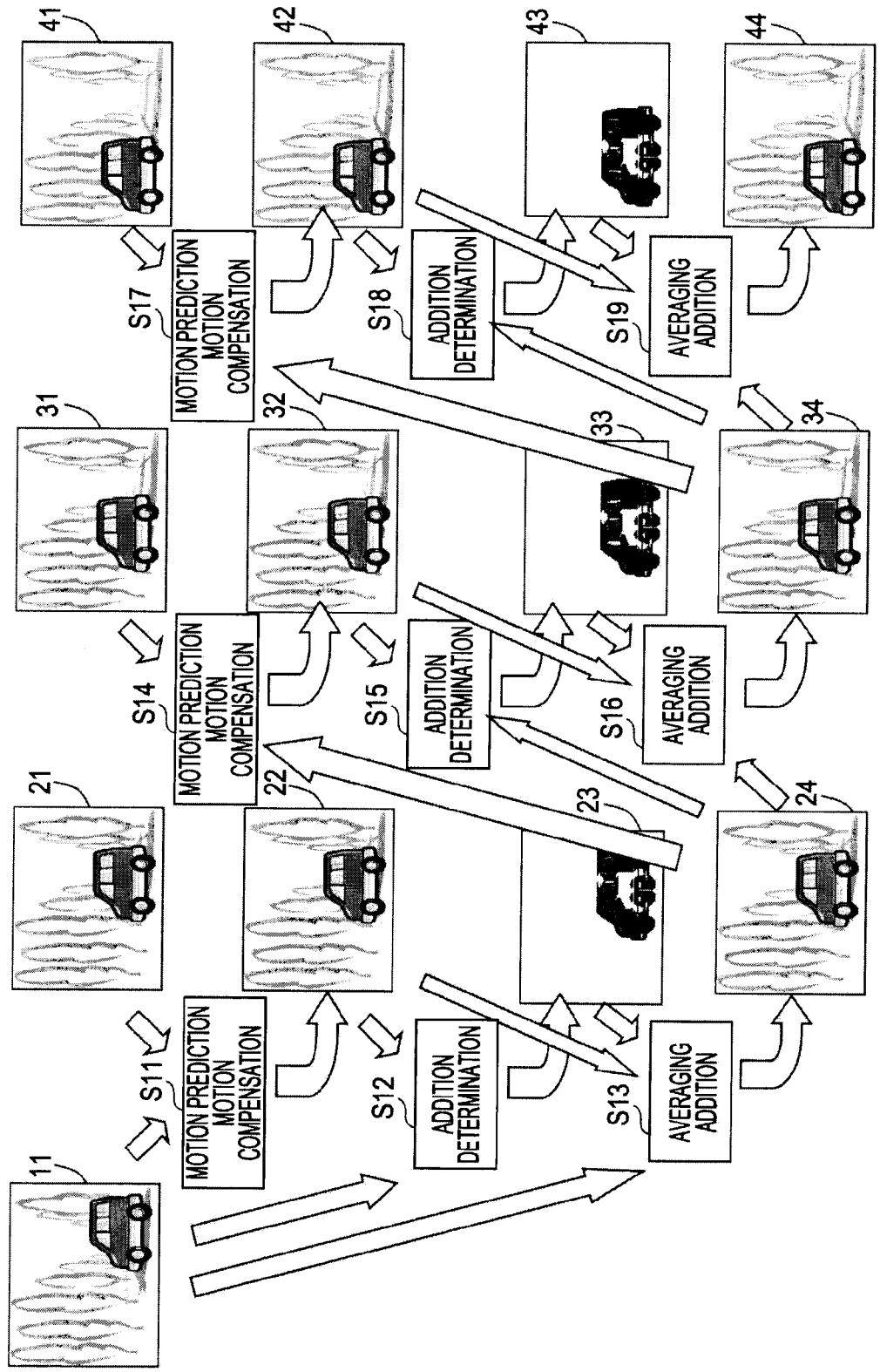
FIG. 2 illustrates an example of a process for generating a noise reduced image.

A specific example of the processing in which the image processing apparatus shown in FIG. 1 is used will be described with reference to FIG. 2. Four images, that is, a current image a, and reference images A to C, shown in the uppermost area of FIG. 2, are images that are continuously captured using a camera. With respect to time, the current image a is first and thereafter, the reference images A to C are captured in succession. The example shown in FIG. 2 shows that the current image is a preceding captured image and the reference image is a succeeding captured image. Alternatively, setting reverse to this, that is, setting in which the current image is used as an image captured later with respect to time, and reference images are used as a plurality of images captured in a preceding manner, may be performed.

In the example shown in FIG. 2, first, processing is performed by using a current image a11 and a reference image A that is the next captured image. In step S11, by using the current image a11 and a reference image A21, a motion vector MV is computed, and by using the computed motion vector MV, a motion compensated image (MC image) is generated.

For example, positioning of the block of the reference image A21 and the corresponding block of the current image a11 is performed so as to generate a motion vector MV in units of blocks. This processing is a process of the motion prediction processor 12 shown in FIG. 1. The motion prediction processor 12 obtains the current image a11 and the reference image A21 from the frame memory 11 and performs the generation. Furthermore, the motion compensation processor 13 performs motion compensation for the reference image by using the motion vector MV so as to generates a motion compensated image (MC image) 22.

Next, in step S12, an addition determination process for comparing the current image a11 with the motion compensated image (MC image) 22 and computing an addition weight representing the reliability of the addition in units of pixels is performed. That is, the correctness of the motion compensation is determined between the current image and the motion compensated image (MC image), and an addition weight in which the addition ratio of the motion compensated image (MC image) 22 is increased by setting the reliability of the pixel in which the motion compensation is correct to be high is computed. A map in which the value of this weight is shown in units of pixels is an addition determination map 23 shown in FIG. 2. This process of step S12 is a process performed by the addition determination unit 14 shown in FIG. 1.

Thereafter, in step S13, a process for adding the current image a11 and the motion compensated image (MC image) 22 by using the addition weight (the addition determination map 23) calculated for each of the corresponding pixels is performed. This process is performed as a process of the addition processor 15 shown in FIG. 1. The image (reference image+ MC image) generated by this addition process is a current image b24 shown in the lowest area of FIG. 2.

This current image b24 is stored in the frame memory 11. Furthermore, this image is combined with a reference image B31, which is an image captured at the next timing of the reference image A21, and processing of steps S14 to S16 is performed. Processing of steps S14 to S16 is identical to the processing of steps S11 to S13.

That is, in step S14, by using the current image b24 and the reference image B31, a motion compensated image (MC image) 32 is generated.

In step S15, by using the current image b24 and the motion compensated image (MC image) 32, an addition determination map 33 is generated.

In step S16, the current image b24 and the motion compensated image (MC image) 32 are added by using the addition determination map 33 so as to generates a current image c34, which is a reference image+MC image.

This current image c34 is stored in the frame memory 11. Furthermore, this image is combined with a reference image C41, which is an image captured at the next timing of the reference image B31, and processing of steps S17 to S19 is performed. The processing of steps S17 to S19 is also identical to the processing of steps S11 to S13.

That is, in step S17, by using the current image c34 and the reference image C41, a motion compensated image (MC image) 42 is generated.

In step S18, by using the current image c34 and the motion compensated image (MC image) 42, an addition determination map 43 is generated.

In step S19, the current image c34 and the motion compensated image (MC image) 42 are added by using the addition determination map 43 so as to generate a noise reduced image (NR image) 44, which is a reference image+MC image.

The processing example shown in FIG. 2 is configured to generates the noise reduced image (NR image) 44 by using three reference images A to C. This is only one example, and the same processing as steps S11 to S13 may be repeated by repeatedly using many more reference images.

Figure 3:
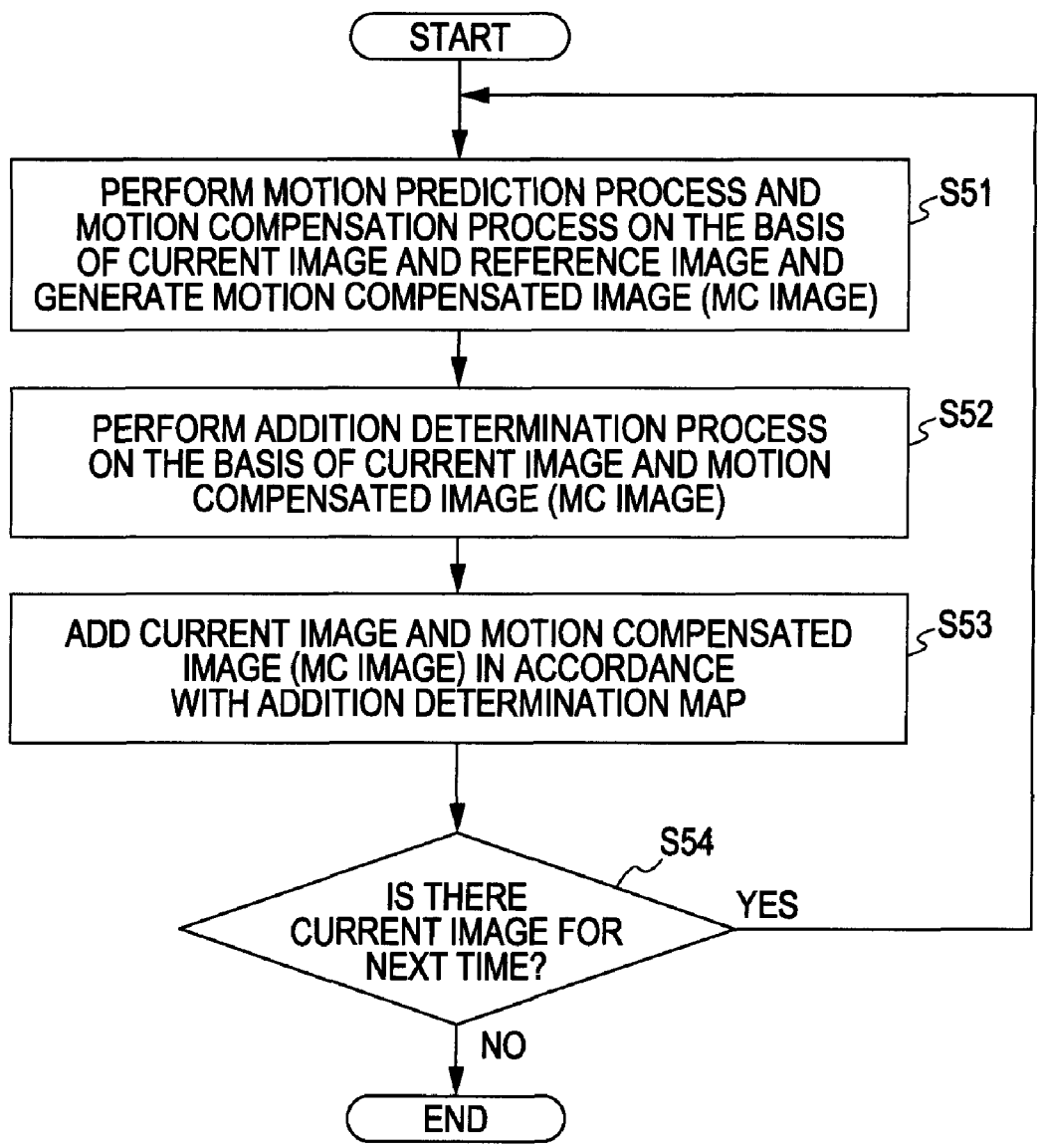
FIG. 3 is a flowchart illustrating a sequence of a process for generating a noise reduced image.

A description will be given below, with reference to the flowchart shown in FIG. 3, of a sequence of generating a noise reduced image (NR image), which is performed by the image processing apparatus shown in FIG. 1. The processes of steps S51 to S53 of the flow shown in FIG. 3 are processes corresponding to steps S11 to S13 shown in FIG. 2.

First, in step S51, a motion vector MV is computed by using the current image and the reference image, and a motion compensated image (MC image) is generated by the motion compensation process for the reference image by using the computed motion vector MV.

Next, in step S52, an addition determination process for comparing the current image with the motion compensated image (MC image) and computing an addition weight representing the reliability of the addition in units of pixels is performed so as to generate an addition determination map.

Thereafter, in step S53, a process for adding the current image and the motion compensated image (MC image) for each of the corresponding pixels in accordance with the addition determination map is performed. As a result of this addition process, a current image or a noise reduced image (NR image) corresponding to the reference image+MC image shown in FIG. 2 is generated.

After the process of step S53, the process proceeds to step S54. In step S54, it is determined whether or not another reference image that can be processed exists. The reference image that can be processed is, for example, an image that contains the same subject as the current image and that was captured at a different timing, more specifically, for example, a continuously captured image. In a case where the reference image that can be processed exists, the process returns to step S51, where the processing of steps S51 to S53 is repeated by using the reference image and the current image corresponding to the reference image+MC image generated in step S53.

When it is determined in step S54 that the reference image that can be processed does not exist, the addition image generated in step S53 is output finally as a noise reduced image (NR image).

(1b) Configuration and Processing of Addition Determination Unit and Addition Processor Next, a description will be given, with reference to FIG. 4 and subsequent figures, of a detail configuration and processing of the addition determination unit 14 and the addition processor 15 inside the image processing apparatus 10 shown in FIG. 1.

First, a description will be given, with reference to FIG. 4, of a detail configuration and processing of the addition determination unit 14 inside the image processing apparatus 10 shown in FIG. 1. FIG. 4 shows an example of the configuration of the addition determination unit 14. As shown in FIG. 4, the addition determination unit 14 has approximately identical determination process structure corresponding to each of a luminance signal Y and two color-difference signals Cb and Cr. Part (a) of FIG. 4 shows a luminance signal Y determination unit, part (b) of FIG. 4 shows a color-difference signal Cb determination unit, and part (c) of FIG. 4 shows a color-difference signal Cr determination unit.

First, the configuration of the determination unit for the luminance signal Y, shown in part (a) of FIG. 4, will be described. The pixel data of the current image and the motion compensated image (MC image) at the same position in terms of space is supplied via filters 111 and 112 to the pixel value difference computation unit 113, where the difference of the pixel values is computed to calculate a difference absolute value. The filters 111 and 112 cut high-frequency components in the image so as to improve the effect of the addition determination. The pixel value difference computation unit 113 computes the difference absolute value of the pixel data of the current image and the motion compensated image (MC image) at the same position in terms of space and supplies the difference absolute value to a pixel addition determination unit 116.

An output signal of a noise estimation unit 110 is supplied to the pixel addition determination unit 116. The luminance signal Y of the current image is input to the noise estimation unit 110 via the filter 111, and estimates the amount of noise corresponding to the pixel value. Furthermore, the noise estimation unit 110 externally receives image-capturing condition information, such as the image-capturing mode, the exposure time period, and the gain information, which exerts an influence upon the amount of noise in the image. The noise estimation unit 110 has, as a table, data on the relation between luminance values and the amount of noise, which were measured in advance under various conditions. The noise estimation unit 110 obtains, from this table, the relation between the luminance value and the amount of noise of the applicable condition, and outputs the amount of noise corresponding to the input luminance value to the pixel addition determination unit 116, the moving average addition determination unit 117, and the moving variance addition determination unit 118.

For example, when the exposure time period is increased, random noise tends to increase. Furthermore, when the gain with which the image pickup signal is amplified is increased, random noise tends to increase. Therefore, a table in which information on the shutter speed and/or the gain is used as the image-capturing condition and the relation of pixel values and the amount of noise is associated with the shutter speed and/or the gain is generated and provided. Furthermore, the image-capturing mode provided in the imaging apparatus may be used as an image-capturing condition. The image-capturing condition is set, for example, for each frame.

The noise estimation unit 110 receives, as image-capturing condition information, from a camera controller, the image-capturing mode, the shutter speed (exposure time period), the gain, and the like, which exert an influence upon the amount of noise in the image, obtains the relation between the luminance value and the amount of noise of the applicable condition on the basis of the data on the relation between the luminance value and the amount of noise, which were measured in advance under various image-capturing conditions, and outputs the amount of noise corresponding to the input luminance under the applicable image-capturing condition.

The amount of noise from the noise estimation unit 110 and the difference absolute value of the pixel value (luminance)

from the pixel value difference computation unit 113 are supplied to the pixel addition determination unit 116. The difference absolute value is an input index value for the pixel addition determination unit 116. The pixel addition determination unit 116 outputs an addition weight, which is the reliability of the addition, corresponding to the index value.

Figure 5:
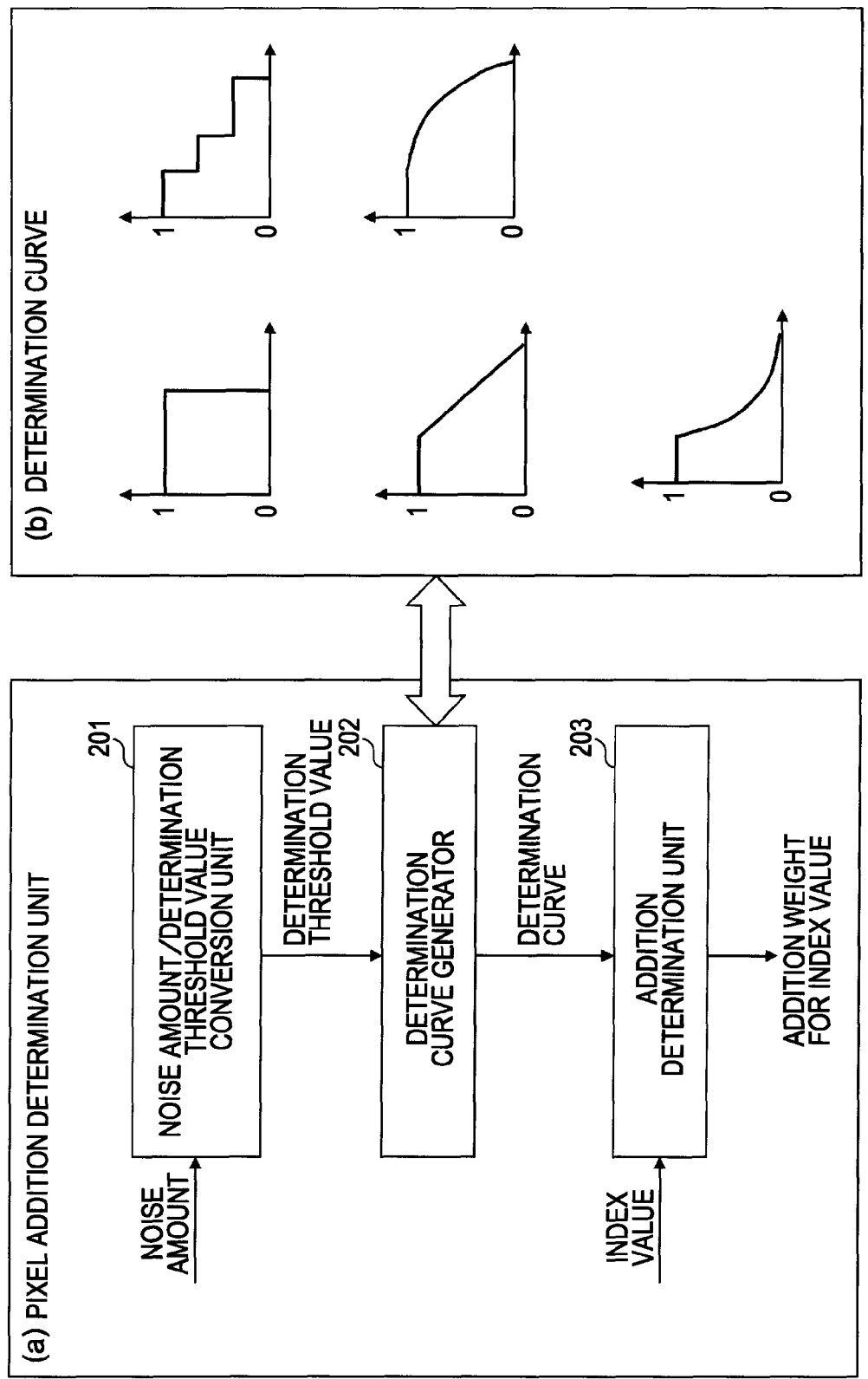
FIG. 5 illustrates a detail example of the configuration of a pixel addition determination unit.

Part (a) of FIG. 5 shows an example of a pixel addition determination unit. The pixel addition determination unit 116 for dealing with the luminance Y is constituted by a noise amount/determination threshold value converter 201 for converting the amount of noise input from the noise estimation unit 110 into a determination threshold value, a determination curve generator 202, and an addition determination unit 203. The noise amount/determination threshold value converter 201 converts the amount of noise into a determination threshold value by using a table determined on the basis of the viewing characteristic, and outputs the determination threshold value. The shape of the determination curve is determined on the basis of the determination threshold value. The determination curve indicates an input index value representing the amount of error, and the shape of the determination curve representing a correspondence with the addition weight representing the reliability for the error.

Part (b) of FIG. 5 shows several examples of determination curves that can be used. The horizontal axis of the graph showing each curve is an input index value, and the vertical axis indicates an addition weight for the index value. In each curve, the value of the index value in which the addition weight changes from 1 and the value of the index value in which the addition weight is 0 are determination threshold values. The magnitude of the determination threshold value is a value in correspondence with the amount of noise. The larger the amount of noise, the larger index value the determination threshold value is set to.

The determination curve generator 202 determines and outputs the determination curve by using the determination threshold value, which is an output of the noise amount/determination threshold value converter 201. The determination curve is formed, for example, as a table and stored in a memory. By using this determination curve, the addition determination unit 203 displays the index value, and outputs the addition weight corresponding to the index value. This addition weight is supplied from the pixel addition determination unit 116 to a multiplier 119. Since the determination curve that is generated using the amount of noise in correspondence with the pixel value in units of pixels is used, the series of conversion, calculation, and determination of the pixel addition determination unit 116 is performed in units of pixels.

The examples of the determination curves shown in part (b) of FIG. 5 show that the output (the addition weight for the index value) is 1 for the index value up to the determination threshold value of 1. During the period from the determination threshold value of 1 up to the determination threshold value of 2, the addition weight gradually decreases toward 0 with respect to the index value. The determination threshold value of 1 and the determination threshold value of 2 cause the shape of the determination curve to be defined. When there is much noise, the index values corresponding to the determination threshold value of 1 and the determination threshold value of 2 are set to be large values. The determination curve shown in part (b) of FIG. 5 allows the input index value to be converted into a corresponding addition weight and output.

The addition weight output from the pixel addition determination unit 116 is supplied to the multiplier 119, whereby the addition weight is multiplied by the addition weight determined similarly to the above-mentioned pixel difference absolute value with regard to the moving average of the luminance signal. The output of the multiplier 119 is supplied to the multiplier 120, whereby the output is multiplied by the addition weight determined similarly to the above-mentioned pixel difference absolute value with regard to the moving variance of the luminance signal. Furthermore, the output of the multiplier 120 is supplied to the multiplier 172, whereby the output is multiplied by the addition weight determined with regard to the pixel of the color signal, the moving average, and the moving variance. At the output of the multiplier 172, the addition weight generated by the addition determination unit 14 is extracted. This addition weight is supplied to the addition processor 15.

Next, a description will be given of a case in which the index value is a moving average difference absolute value and a moving variance difference absolute value of the luminance signal. As shown in FIG. 4, the pixel data of the current image and the motion compensated image (MC image) at the same position in terms of space is supplied to the moving average difference computation unit 114 and the moving variance difference computation unit 115 via the filters 111 and 112, respectively.

The moving average difference computation unit 114 calculates a difference of moving averages of pixel values in a rectangular area in which the pixel (center pixel) for which calculation is performed is at the center, for example, an area of (5×5) pixels. First, with respect to each of the current image and the motion compensated image (MC image), the moving average is computed by shifting the rectangular area while causing the rectangular area to overlap with the calculation area of the previous pixel in response to the movement of the center pixel. Thereafter, a difference in the moving averages is computed for each of the corresponding pixels of each image.

The moving variance difference computation unit 115 calculates the variance of pixel values in the rectangular area in which the pixel (center pixel) for which calculation is performed is at the center. The moving variance is computed by shifting the rectangular area while causing the rectangular area to overlap with the calculation area of the previous pixel in response to the movement of the center pixel. Thereafter, the difference in the moving variances is computed for each of the corresponding pixels of each image.

The reason for obtaining the addition weight with regard to the moving average and the moving variance is that a decrease in the amount of noise is performed more accurately. For example, when the moving average or the moving variance of the area of a plurality of pixels differs, often, the case in which the images are determined to differ is more correct than the case in which the difference absolute value of the pixel values is determined to be noise.

The moving average difference computation unit 114 outputs the absolute value of the difference signal of the moving average, and the moving variance difference computation unit 115 outputs the absolute value of the difference signal of the moving variance. The absolute value of the respective differences is supplied to the moving average addition determination unit 117 and the moving variance addition determination unit 118.

The output signal of the noise estimation unit 110 is supplied to the moving average addition determination unit 117 and the moving variance addition determination unit 118. Both the moving average addition determination unit 117 and the moving variance addition determination unit 118 are configured similarly to the pixel addition determination unit 116 (see part (a) of FIG. 5), and generate a determination curve (table) on the basis of the determination threshold value in which the amount of noise is converted. By supplying the moving average difference absolute value and the moving variance difference absolute value as the index values of this determination curve, the addition weight is determined. The addition weight of the luminance signal from the moving average addition determination unit 117 is supplied to the multiplier 119, whereby the addition weight is multiplied by the output of the pixel addition determination unit 116. The multiplication result is further multiplied by the multiplier 120 by the addition weight of the luminance signal from the moving variance addition determination unit 118.

The foregoing is a process for obtaining an addition weight by using the pixel difference absolute value, the moving average difference absolute value, and the moving variance difference absolute value of the luminance signal as an index value. Regarding a color signal, an addition weight is determined in a similar manner. In the case of a component color video signal, the ratio among the sampling frequency regarding the luminance signal Y, the sampling frequency regarding the color-difference signal Cb, and the sampling frequency regarding the color-difference signal Cr is represented like (4:2:0), (4:2:2), or (4:1:1). Regarding each of the color-difference signals Cb and Cr, an addition weight is determined similarly to the above-mentioned luminance signal Y.

Regarding the luminance signal and the color-difference signals Cb and Cr, a process for generating an addition weight is performed with regard to the same area in the image. As can be seen from the ratio of the above-mentioned sampling frequencies, the number of addition weights obtained with regard to the color-difference signals Cr and Cb is insufficient when compared to the addition weights obtained with regard to the luminance signal Y. In order to solve this problem, an up-sampling processor 171 for performing interpolation is provided, and the addition weight regarding the color-difference signals from the up-sampling processor 171 is supplied to the multiplier 172, whereby the addition weight is multiplied by the addition weight regarding the luminance signal.

Processing for the color-difference signal Cb will be described. The color-difference signal Cb of the current image is supplied to a noise estimation unit 130 via a filter 131. The image-capturing condition information is supplied to the noise estimation unit 130. Similarly to the noise estimation unit 110 for the luminance signal, the noise estimation unit 130 computes an estimated value of the amount of noise corresponding to the color-difference signal Cb of the current image on the basis of a table indicating the relation between the pixel values and the amount of noise in accordance with various image-capturing conditions. The noise estimation unit 130 outputs the estimated value of the amount of noise to the pixel addition determination unit 136, the moving average addition determination unit 137, and the moving variance addition determination unit 138.

The color-difference signal Cb of the current image and the color-difference signal Cb of the motion compensated image (MC image) are supplied to the pixel value difference computation unit 133 via filters 131 and 132, respectively, whereby the difference in the pixel values is computed, and the difference absolute value is computed. The pixel value difference computation unit 133 computes the difference absolute value of the pixel data of the current image and the motion compensated image (MC image) at the same position in terms of space, and supplies the difference absolute value to the pixel addition determination unit 136.

The pixel addition determination unit 136 has the same configuration as illustrated in FIG. 5 described as the configuration of the pixel addition determination unit 116 for dealing with the luminance Y. The pixel addition determination unit 136 is constituted by a noise amount/determination threshold value converter 201 for converting the amount of noise input from the noise estimation unit 130 into a determination threshold value, a determination curve generator 202, and an addition determination unit 203. For example, the determination curve shown in part (b) of FIG. 5 allows the input index value to be converted into a corresponding addition weight and output. The pixel addition determination unit 136 outputs the addition weight, which is the reliability of the addition, corresponding to the index value (pixel difference absolute value).

Next, a description will be given below of a case in which index values are the moving average difference absolute value and the moving variance difference absolute value of the color-difference signal Cb. Pixel data of the current image and the motion compensated image (MC image) at the same position in terms of space is supplied to the moving average difference computation unit 134 and the moving variance difference computation unit 135 via the filters 131 and 132.

The moving average difference computation unit 134 calculates a difference of the moving averages of the pixel values in a rectangular area in which the pixel (center pixel) for which a calculation is performed, for example, in an area of (5×5) pixels. First, the moving average is computed by shifting the rectangular area while causing the rectangular area to overlap with the calculation area of the preceding pixel in response to the movement of the center pixel with regard to each of the current image and the motion compensated image (MC image). Thereafter, the difference in the moving averages is computed for each of the corresponding pixels of each image.

The moving variance difference computation unit 135 calculates the variance of pixel values within the area of the rectangular area in which the pixel (center pixel) for which a calculation is performed is at the center. The computation of the moving variance is performed by shifting the rectangular area while causing the rectangular area to overlap with the calculation area of the previous pixel in response to the movement of the center pixel. Thereafter, the difference in the moving variances is computed for each of the corresponding pixels of each image.

The reason for obtaining an addition weight for the moving average and the moving variance is that a decrease in the amount of noise is accurately performed. The moving average difference computation unit 134 outputs the absolute value of the difference signal of the moving average, and the moving variance difference computation unit 135 outputs the absolute value of the difference signal of the moving variance. The absolute values of the respective differences are supplied to the moving average addition determination unit 137 and the moving variance addition determination unit 138.

The output signal of the noise estimation unit 130 is supplied to the moving average addition determination unit 137 and the moving variance addition determination unit 138. Both the moving average addition determination unit 137 and the moving variance addition determination unit 138 have the same configuration as the pixel addition determination unit 136 (see part (a) of FIG. 5), and generate a determination curve (table) on the basis of the determination threshold value obtained by converting the amount of noise. By supplying the moving average difference absolute value and the moving variance difference absolute value as the index values for this determination curve, the addition weight is obtained. The addition weight from the moving average addition determination unit 137 for the color-difference signal Cb is supplied to the multiplier 139, whereby the addition weight is multiplied by the output of the pixel addition determination unit 116 for the color-difference signal Cb. The multiplication result is further multiplied by the multiplier 140 by the addition weight from the moving variance addition determination unit 138 for the color-difference signal Cb.

Regarding the other color-difference signal Cr, a configuration identical to that of the color-difference signal Cb is provided. That is, addition weights in which the pixel difference absolute value of the color-difference signal Cr is an index value are obtained by filters 151 and 152, the noise estimation unit 150, the pixel value difference computation unit 153, and the pixel addition determination unit 156. Addition weights in which the moving average difference absolute value of the color-difference signal Cr is an index value are obtained by the filters 151 and 152, the noise estimation unit 150, the moving average difference computation unit 154, and the moving average addition determination unit 157. Addition weights in which the moving variance difference absolute value of the color-difference signal Cr is an index value are obtained by the filters 151 and 152, the noise estimation unit 150, the moving variance difference computation unit 155, and the moving average addition determination unit 158.

The addition weight in which the pixel difference absolute value is an index value is multiplied by the multiplier 159 by the addition weight in which the moving average difference absolute value is an index value. The output of the multiplier 159 is multiplied by the multiplier 160 by the addition weight in which the moving variance difference absolute value is an index value. The addition weight regarding the color-difference signal Cr, which is output from the multiplier 160, and the addition weight regarding the color-difference signal Cb are multiplied with each other by the multiplier 141. The output of the multiplier 141 is supplied to the up-sampling processor 171. The up-sampling processor 171 interpolates the addition weight for the color difference in accordance with a color-difference format so as to cause the score to be equal to the luminance addition weight. The output of the up-sampling processor 171 and the output of the multiplier 120 are multiplied with each other by the multiplier 172. The output of the multiplier 172 is an addition weight indicating the final reliability of the pixel of interest. The addition weight represents the reliability of each of the luminance pixel, the luminance moving average, the luminance moving variance, the color-difference pixel, the color-difference moving average, and the color-difference moving variance, and is represented using a continuous value from 0 to 1.

Figure 6:
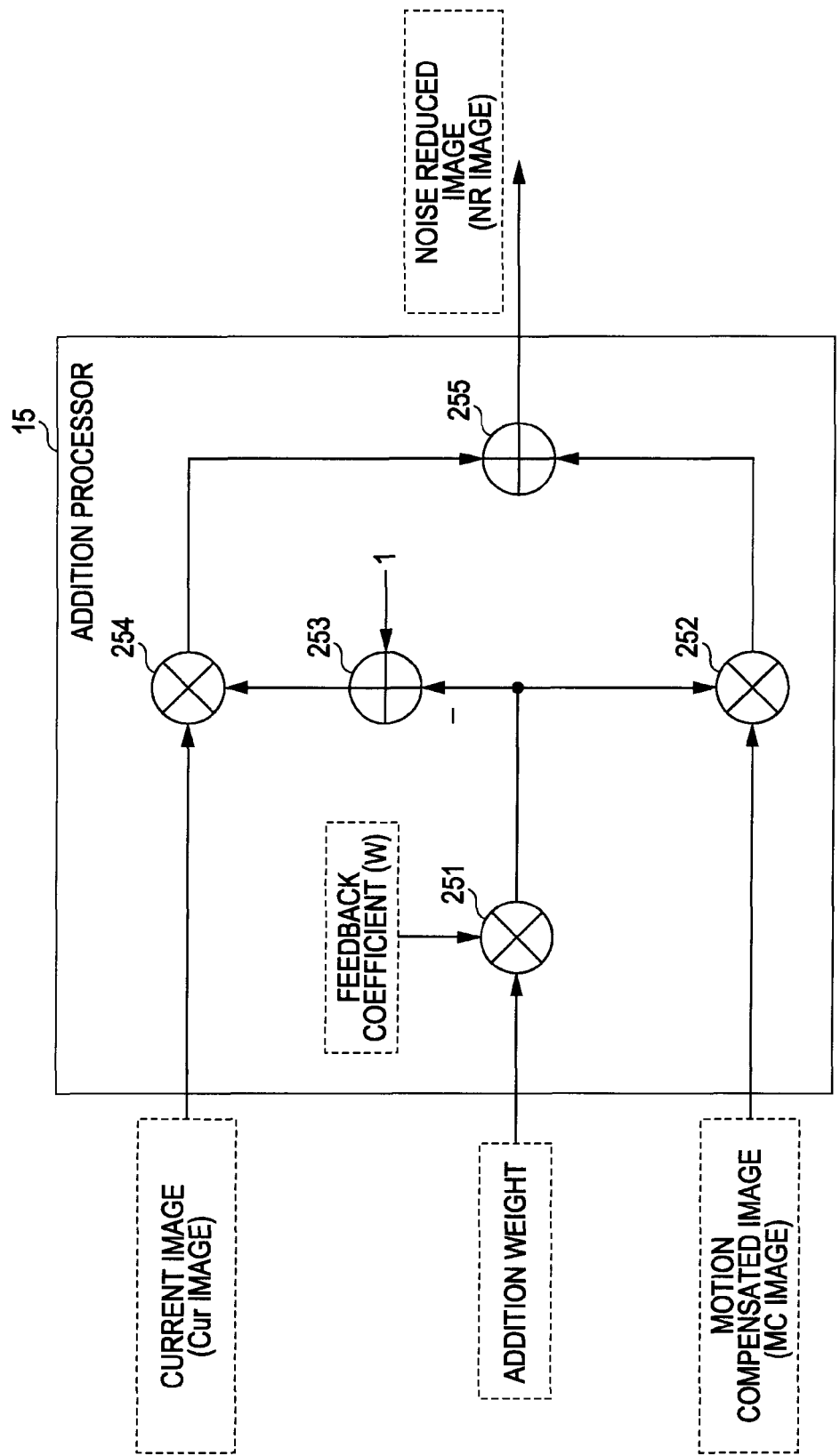
FIG. 6 illustrates an example of the configuration of an addition processor.

Next, a description will be given, with reference to FIG. 6, of a detail configuration and processing of the addition processor 15 inside the image processing apparatus 10 shown in FIG. 1. A motion compensated image (MC image), a current image, and addition weight information from the addition determination unit 14 are input to the addition processor 15.

A multiplier 251 multiplies the addition weight that is the output of the addition processor 15 by a feedback coefficient (w). For example, if the feedback factor is set to ⅓, when the addition weight changes from 0 to 1, the weight for the motion compensated image (MC image) at the weighted average changes from 0 to ⅓.

The coefficient (represented by a) output from the multiplier 251 is supplied to the multiplier 252, whereby the coefficient is multiplied by the motion compensated image (MC image). Furthermore, the coefficient α is supplied to the subtractor 253, whereby (1-α) is generated. (1-α) is supplied to the multiplier 254, whereby (1-α) is multiplied by a current image (Cur image). The outputs of the multiplier 252 and the multiplier 254 are added by the adder 255, and a noise reduced image (NR image) is output from the adder 255.

The noise reduced image (NR image) as the result, in which the current image generated in the addition processor 15 and the motion compensated image (MC image) are added, may further be stored in the frame memory 11. This image can be used as a new current image and combined with a new reference image, so that the same processing as the above-described processing can be repeatedly performed.

For example, after a pre-specified number of processes is repeated, the result in which the current image and the motion compensated image (MC image), which are generated by the addition processor 15, are added can be output as a final noise reduced image (NR image).

(2) Image Processing Apparatus Capable of High-Speed Processing and Generating High-Accuracy Noise Reduced Image Next, a description will be given of the configuration and the processing of an image processing apparatus capable of high-speed processing and generating a high-accuracy noise reduced image according to an embodiment of the present invention.

A description will be given of problems of the image processing apparatus 10 shown in FIG. 1, which have been described in the above-mentioned items (1a) and (1b). As described with reference to FIG. 4, the addition determination unit 14 of the image processing apparatus 10 shown in FIG. 1 receives corresponding data of a current image and a motion compensated image (MC image) in units of pixels and generates addition weight information in units of pixels. Therefore, the processing by the addition determination unit 14 takes a processing time corresponding to the number of pixels. If processing of image data having a large number of pixels, such as high-image-quality data, is performed, the processing time takes a lot of time, and time is taken until the result is output. That is, much time is taken until a final noise reduced image is generated. An embodiment of the image processing apparatus of the present invention to be described below has a configuration that solves such problems and that is capable of performing a high-speed addition determination process.

Furthermore, as described with reference to FIG. 4, the addition determination unit 14 described in the above-mentioned items (1a) and (1b), computes a weight corresponding to each pixel on the basis of the corresponding data of the current image and the motion compensated image (MC image) in units of pixels. The reference image from which the motion compensated image (MC image) is generated is an image captured at a time different from that of the current image. In the motion compensation processor 13 shown in FIG. 1, motion compensation is performed on the basis of the motion vector computed by the motion prediction processor 12 so as to generate a motion compensated image (MC image).

However, in a case where, for example, a moving object, such as a car or a person, exists as a moving body that shows a motion different from the background within the image, there is a case in which these moving objects show a motion different from the motion vector computed by the motion prediction processor 12. That is, an image area that shows a motion that does not match the motion vector generated in the motion prediction processor 12 is generated. Such an area will be referred to as a motion estimation (ME) failure area. On the other hand, an image area that shows a motion that matches the motion vector generated in the motion prediction processor 12 will be referred to as a motion estimation (ME) success area. If a motion estimation (ME) failure area is contained, an accurate motion compensated image (MC image) is not generated.

The addition determination unit performs a process for comparing the corresponding pixels of the current image and the motion compensated image (MC image), for example, computes a pixel value difference. In the motion estimation (ME) failure area, this pixel difference becomes a large value. However, in the process of the addition determination unit 14 described in the above-mentioned items (1a) and (1b), it is not possible to determine whether this difference is a difference resulting from an incorrect (deteriorated) motion compensated image (MC image) due to the motion estimation (ME) failure or is a difference resulting from strong noise. In such a case, an incorrect addition weight may be output, with the result that a noise reduced image in which noise is not sufficiently reduced is generated.

Figure 7:
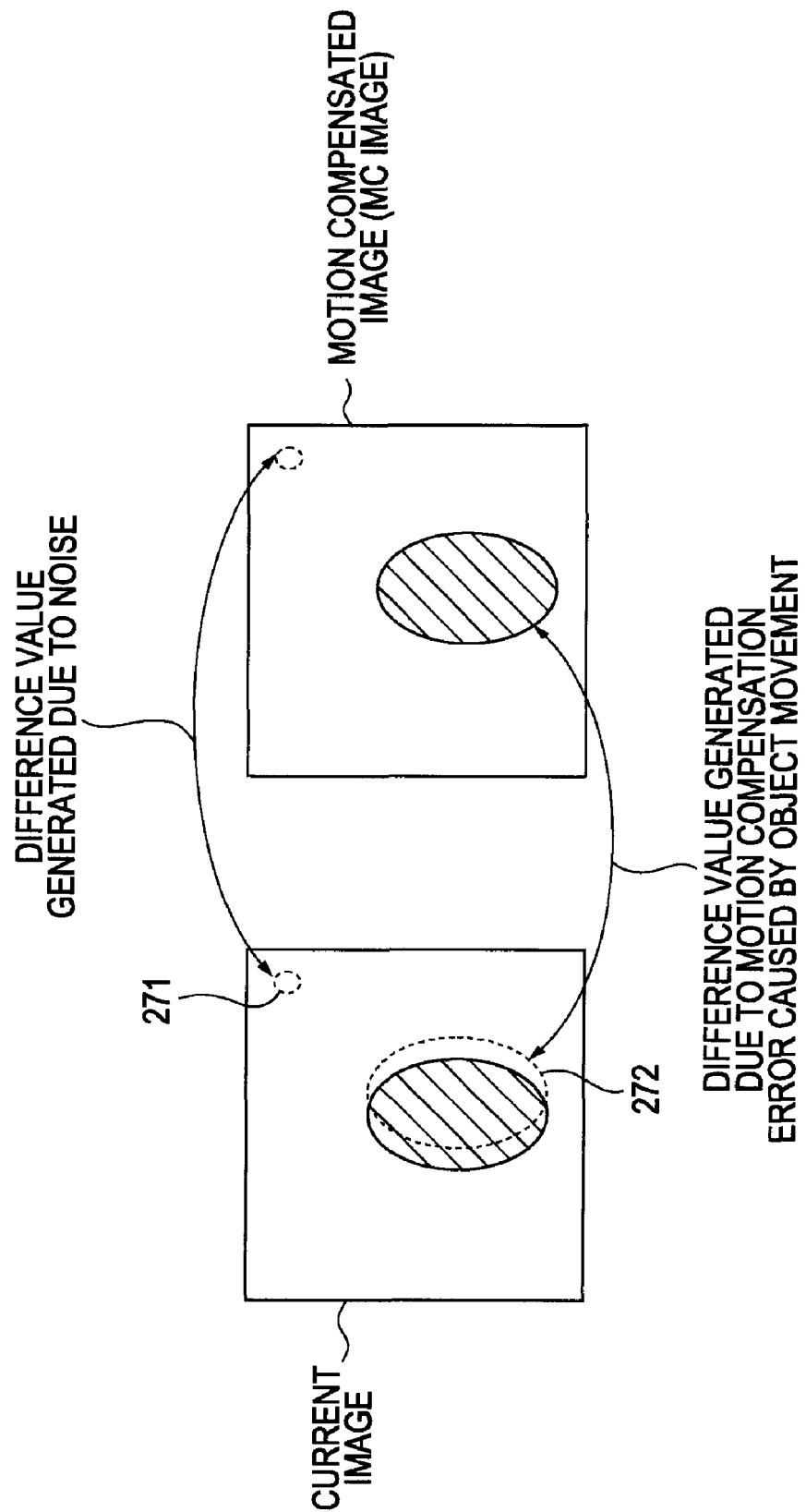
FIG. 7 illustrates problems of addition determination, and an addition weight generation processes using a current image and a motion compensated image (MC image)

A case will be considered in which, for example, the addition determination unit 14 receives the current image and the motion compensated image (MC image) shown in FIG. 7 so as to perform addition determination, and outputs an addition weight in units of pixels. In a pixel 271, the pixel values of the corresponding pixels of the current image and the motion compensated image (MC image) differ depending on noise. In a pixel 272, a difference in pixels, generated due to a motion compensation error resulting from the object movement, is generated. It is not possible for the addition determination unit to determine whether this difference is a difference generated resulting from an incorrect (deteriorated) motion compensated image (MC image) as a result of motion estimation (ME) failure or is a difference due to strong noise.

The image processing apparatus according to an embodiment of the present invention to be described below has a configuration that solves such problems, that determines whether the difference is a difference generated resulting from an incorrect (deteriorated) motion compensated image (MC image) due to motion estimation (ME) failure or is a difference due to strong noise, and that computes an optimum addition weight in a case where the pixel values of the corresponding pixels of the current image and the motion compensated image (MC image) differ. The outline of this process will be described with reference to FIG. 8.

For example, in the addition determination unit of the image processing apparatus according to an embodiment of the present invention, a difference image of the current image and the motion compensated image (MC image) is divided into small areas, and a prediction of whether or not failure of motion estimation (ME) using a motion vector is contained is performed in units of each small area.

Figure 8:
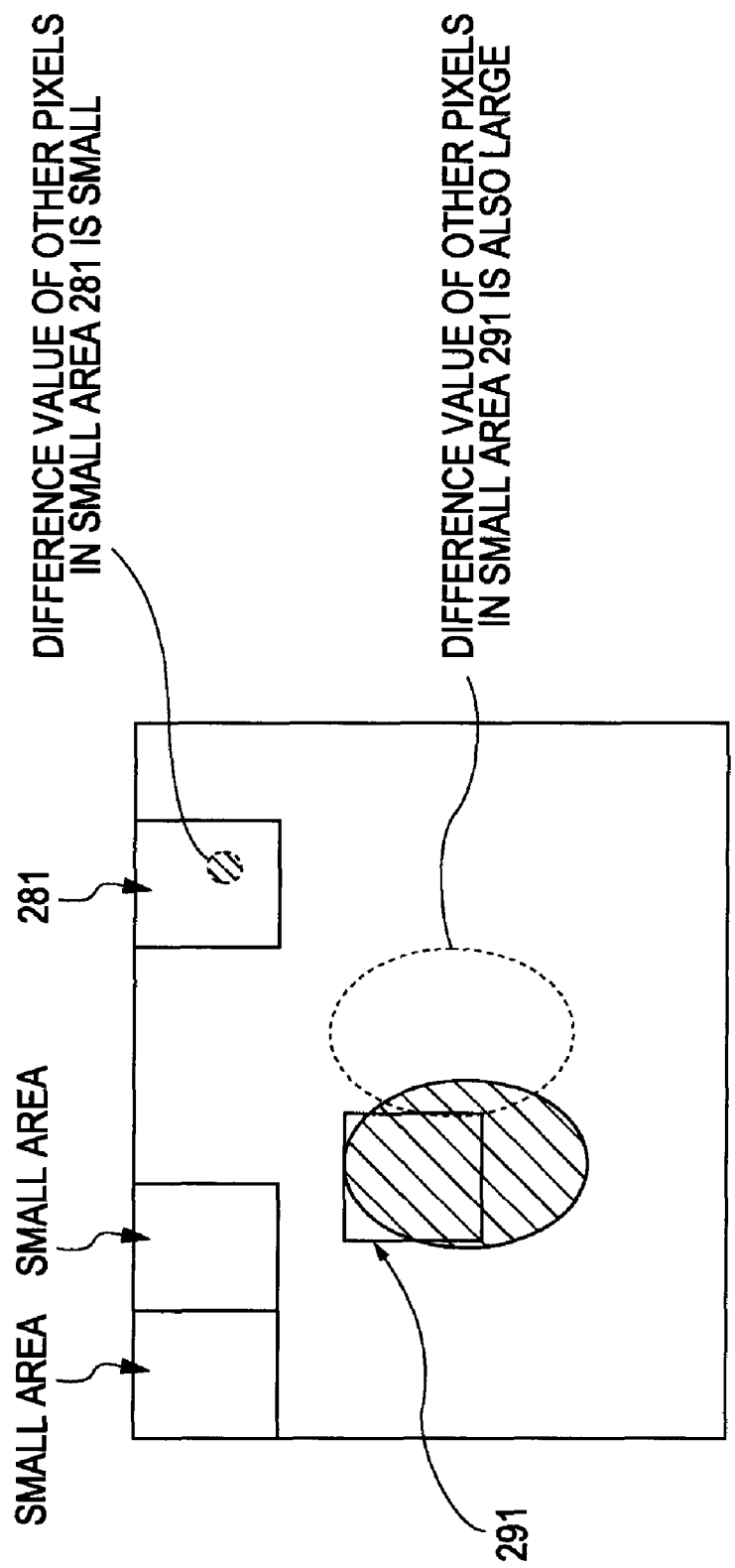
FIG. 8 illustrates an example of an addition determination process of an image processing apparatus according to an embodiment of the present invention.

For example, in a small area 281 shown in FIG. 8, the difference value of some of the pixels contained in the small area 281 is large, but the difference value of most of the other pixels contained in the small area 281 is small. The addition determination unit of the image processing apparatus according to an embodiment of the present invention to be described below determines that such a pixel having a large difference value contained in the small area 281 is a pixel in which noise is generated.

Additionally, in a small area 291 shown in FIG. 8, the difference value of some of pixels of the pixels contained in the small area 291 is large, and the difference value of most of the pixels contained in the small area 291 is also large. The addition determination unit of the image processing apparatus according to an embodiment of the present invention determines that such a pixel having a large difference value, contained in the small area 291, is not a pixel in which noise is generated, and the difference is a difference generated resulting from an incorrect (deteriorated) motion compensated image (MC image) due to motion estimation (ME) failure.

As described above, the addition determination unit of the image processing apparatus (to be described later) according to an embodiment of the present invention determines whether or not the difference in the pixels having a large difference value is a difference due to noise or a difference generated resulting from an incorrect (deteriorated) motion compensated image (MC image) due to motion estimation (ME) failure, and changes the setting of the addition weight on the basis of the discrimination result.

Figure 9:
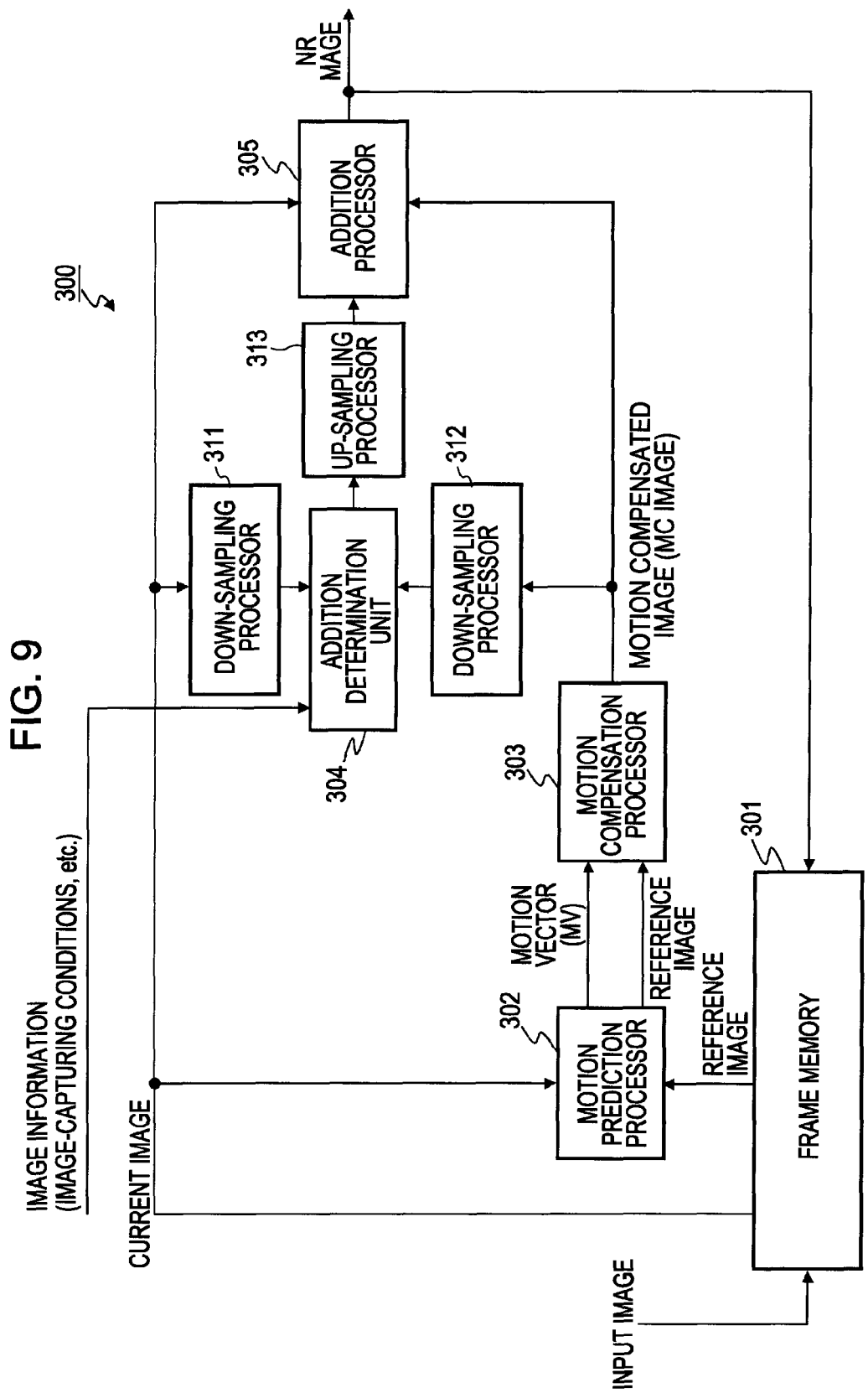
FIG. 9 illustrates an example of the configuration of an image processing apparatus according to an embodiment of the present invention.

(2a) Image processing apparatus (first embodiment) that performs addition determination process using reduced image FIG. 9 shows an example of the configuration of an image processing apparatus according to a first embodiment of the present invention. An image processing apparatus 300 shown in FIG. 9 has the same configuration as the image processing apparatus 10 described earlier with reference to FIG. 1. A frame memory 301, a motion prediction processor 302, a motion compensation processor 303, an addition determination unit 304, and an addition processor 305 perform processing that is substantially the same as that of the respective components shown in FIG. 1. However, the addition determination unit 304 in the present embodiment has a configuration different from the addition determination unit 14 of FIG. 1 described earlier, and performs different processing.

Furthermore, the image processing apparatus 300 shown in FIG. 9 has the following additional configuration that is not set in the image processing apparatus 10 described earlier with reference to FIG. 1:

a down-sampling processor 311 that performs a process for reducing a current image to be input to the addition determination unit 304, a down-sampling processor 312 that performs a process for reducing a motion compensated image (MC image) to be input to the addition determination unit 304, and an up-sampling processor 313 that performs a process for expanding an addition coefficient map in which an addition weight input from the addition determination unit 304 to the addition processor 305 is shown in such a manner as to be associated with each pixel.

The processing performed by the down-sampling processors 311 and 312 is processing for decreasing the number of pixels forming the input image and generating an image having a small number of pixels. For example, a process for collecting nine pixels forming the input image into one pixel so as to decrease the total number of constituent pixels is performed. The reduced image described in this specification is an image that is generated by decreasing the number of constituent pixels of the original image.

Furthermore, the processing performed by the up-sampling processor 313 is a process for increasing the number of constituent pixels of the input image so as to generate an image having a large number of pixels. For example, a process for expanding one pixel forming an input image into nine pixels so as to increase the total number of constituent pixels is performed. The expanded image described in this specification is an image generated by increasing the number of constituent pixels of the original image.

A description will be given of processing of each component of the image processing apparatus 300 shown in FIG. 9. The image processing apparatus 300 shown in FIG. 9 can be a single image processing apparatus. Alternatively, the image processing apparatus 300 can also be one component inside, for example, a camera, a PC, or an image display device.

In the following, a description will be given by assuming that the image processing apparatus 300 shown in FIG. 9 is provided inside a camera, and continuously captured images are sequentially stored as input images in the frame memory

301. The input image is an image containing noise. The image processing apparatus 300 reduces noise from this input image, and finally outputs a noise reduced image (NR image) as an output of the addition processor 305 shown in FIG. 9.

A current image and a reference image are input to the motion prediction processor 302 from the frame memory 301. The current image is an image for which a noise reduction process is performed, and the reference image is an image used for a noise reduction process for the current image. For example, a motion vector is obtained from the current image and the reference image. The noise reduction process for the current image is performed by using a plurality of continuously captured reference images.

For example, a noise reduced image generated by using one current image and one reference image is stored again in the frame memory 301. By using this noise reduced image as a new current image, a noise reduction process is further performed by using the next second reference image. A specific processing example is the same as the processing described earlier with reference to FIG. 2.

The motion prediction processor 302 computes a motion vector by using a current image and a reference image from the frame memory 301. For example, positioning of the block of the reference image and the corresponding block of the current image is performed in units of small areas (blocks) in which one image frame is divided, and a motion vector MV in units of blocks is output. The motion vector MV is a vector indicating the inter-image motion between the current image and the reference image. The motion vector can be set as a vector containing information on not only parallel movement, but also expansion and contraction, rotation, and the like.

For detecting the motion vector MV, for example, a block matching method can be applied. The block matching method is a process in which a small area (block) is further divided into very small blocks, the absolute difference value (SAD: Sum of Absolute Difference) of pixel values of each very small block of the current image and the reference image is computed, and the pair of very small blocks in which the absolute difference value (SAD) is small includes corresponding blocks. It is possible to determine the vector that connects the corresponding blocks of the two images as a motion vector.

The motion compensation processor 303 performs the motion compensation of the current image or the reference image by using the motion vector MV generated by the motion prediction processor 302, and generates a motion compensated image (MC image). That is, a motion compensated image (MC image) in which the current image or the reference image is moved so as to cause the subject position of the current image to match the subject position of the reference image is generated. The motion compensated image (MC image) generated by the motion compensation processor 303 is supplied to the addition determination unit 304 and the addition processor 305.

However, in the configuration of the present embodiment, the following components are newly added:

a down-sampling processor 311 for performing a process for reducing a current image to be input to the addition determination unit 304, and a down-sampling processor 312 for performing a process for reducing a motion compensated image (MC image) to be input to the addition determination unit 304.

The addition determination unit 304 receives the reduced image of the motion compensated image (MC image), which is generated by the motion compensation processor 303, the reduced image of the current image used for estimating the amount of noise, and image information (image-capturing conditions, etc.), and generates an addition weight corresponding to the reduced image in units of pixels. The addition determination unit 304 generates an addition coefficient map in which an addition weight in units of pixels is set, and outputs the addition coefficient map. In the configuration of the present embodiment, the addition determination unit 304 should perform a process for the constituent pixels of the reduced image. Therefore, when compared to the case in which the process in accordance with the configuration described earlier with reference to FIG. 1, that is, an addition determination process using the original current image and the motion compensated image (MC image), is performed, the number of pixels for which processing is performed is greatly reduced, and a processing load can be greatly reduced.

As described above, the addition determination unit 304 receives a reduced motion compensated image (reduced MC image) such that the motion compensated image (MC image) generated by the motion compensation processor 303 is reduced by the down-sampling processor 312, a reduced current image such that the current image is reduced by the down-sampling processor 311, and image information (image-capturing conditions, etc.) used for estimating the amount of noise. The image information is supplied from, for example, a microcomputer inside a camera. The image information contains information on the image-capturing mode, the exposure time period, the gain, and the like corresponding to the input image (captured image).

The addition determination unit 304 generates an addition weight in units of constituent pixels of the reduced image. The addition weight represents the reliability of the addition. That is, the addition determination unit 304 determines the correctness of the motion compensation performed between the current image and the motion compensated image (MC image), and computes a weight in which the reliability of the pixel in which the motion compensation is correct is set to be high. An addition coefficient map is generated and output in which regarding a pixel at which the motion compensation is estimated to be correct, an addition weight in which the addition ratio of the motion compensated image (MC image) is increased is computed, regarding a pixel at which the motion compensation is estimated to be incorrect, an addition weight in which the addition ratio of the motion compensated image (MC image) is decreased is computed, the addition weight of each of the constituent pixels of the reduced image is computed, and the addition weight is associated with each pixel.

As described earlier with reference to FIG. 8, the addition determination unit 304 in the present embodiment is configured in such a manner that in a case where the pixel values of the corresponding pixels of the current image and the motion compensated image (MC image) differ, it is determined whether the difference is a difference generated resulting from an incorrect (deteriorated) motion compensated image (MC image) due to motion estimation (ME) failure or is a difference due to strong noise, and an optimum addition weight is computed. The details of this process will be described later.

The addition coefficient map generated by the addition determination unit 304 is input to the up-sampling processor 313. The up-sampling processor 313 performs a process for expanding the addition coefficient map generated by the addition determination unit 304 into the same number of pixels as those of the original current image and the motion compensated image (MC image). The up-sampling processor 313 outputs the expanded addition coefficient map to the addition processor 305.

The addition processor 305 performs a process for adding the current image and the motion compensated image (MC image) by using an addition weight calculated for each of the corresponding pixels. The process of the addition processor 305 is a process similar to that described earlier with reference to FIGS. 1 and 6. That is, a process for calculating and adding the weighted average of the current image and the motion compensated image (MC image) is performed. The weight of the weighted average is a value obtained by multiplying the addition weight by a feedback factor. For example, if the feedback factor is set to ⅓, when the addition weight changes from 0 to 1, the weight for the MC image at the weighted average changes from 0 to ⅓.

The result in which the current image and the motion compensated image (MC image) generated in the addition processor 305 are added is stored in the frame memory 301. By using this image as a new current image and combining this image with a new reference image, the processing similar to the above-mentioned processing is repeatedly performed. For example, after a pre-specified number of processes is repeated, the result in which the current image and the motion compensated image (MC image), which are generated by the addition processor 305, are added, is output as a noise reduced image (NR image).

Figure 10:
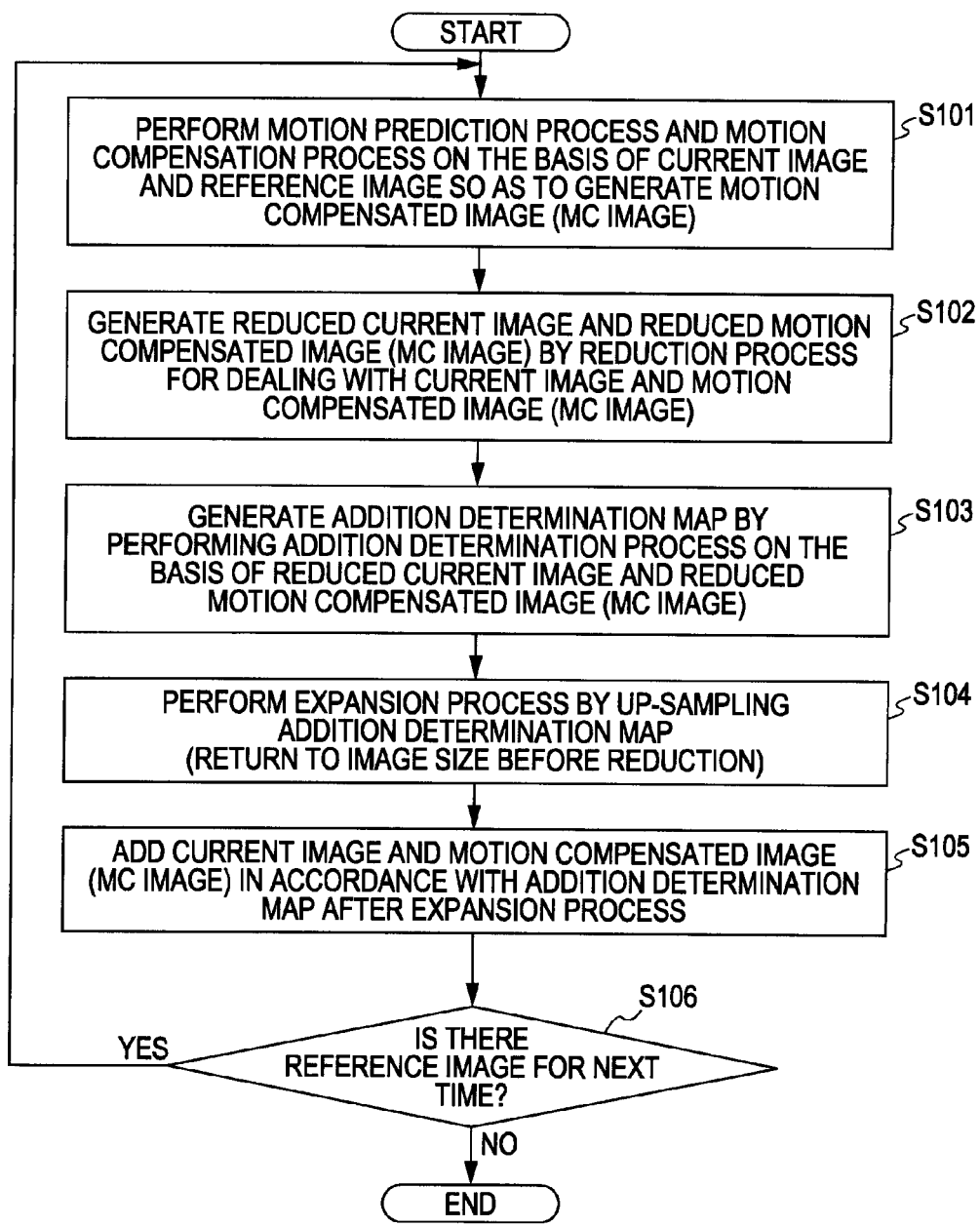
FIG. 10 shows a flowchart illustrating a processing sequence performed by an image processing apparatus according to an embodiment of the present invention.

FIG. 10 is a flowchart showing a processing sequence of the image processing apparatus 300 shown in FIG. 9. The process of each step will be described. First, in step S101, a motion vector MV is computed by using a current image and a reference image, and by using the computed motion vector MV, a motion compensated image (MC image) is generated by performing a motion compensation process for the reference image.

Next, in step S102, reduced images of the current image and the motion compensated image (MC image) are generated by performing down-sampling processes on the current image and the motion compensated image (MC image).

Next, in step S103, an addition determination process for comparing the reduced current image with the reduced motion compensated image (reduced MC image) and computing an addition weight indicating the reliability of the addition in constituent pixels of the reduced images is performed, and an addition determination map in which the addition weights (=addition coefficients) in constituent pixels of the reduced images are set is generated.

Next, in step S104, by performing an up-sampling process (expansion process) for the addition determination map in which the addition weights (=addition coefficients) in constituent pixels of the reduced images are set, an addition determination map formed from the same number of pixels as those of the original current image and the motion compensated image (MC image) is generated.

Thereafter, in step S105, a process for adding the current image and the motion compensated image (MC image) for each of the corresponding pixels in accordance with the up-sampled addition determination map is performed. As a result of this addition process, a noise reduced image (NR image) or a new current image used for further reducing noise is generated.

After the process of step S105, the process proceeds to step S106. In step S106, it is determined whether or not another reference image that can be processed exists. The reference image that can be processed is, for example, an image that contains the same subject as the current image and that was captured at a different timing. More specifically, the reference image is, for example, a continuously captured image. In a case where a reference image that can be processed exists, the process returns to step S101, and by using the reference image and the current image corresponding to the reference image+ MC image, which was generated in step S106, processing of step S101 and subsequent steps is repeated.

When it is determined in step S106 that a reference image that can be processed does not exist, the addition image generated finally in step S105 is output as a noise reduced image (NR image).

As described above, the image processing apparatus 300 according to the present embodiment inputs, to the addition determination unit 304, the reduced motion compensated image (reduced MC image) such that the motion compensated image (MC image) generated by the motion compensation processor 303 is reduced by the down-sampling processor 312 and the reduced current image such that the current image is reduced by the down-sampling processor 311. Therefore, the addition determination unit 304 should generate an addition weight in units of pixels with respect to the constituent pixels of the reduced image. Thus, the number of calculations can be reduced, the processing is made efficient, and high-speed processing is realized.

Various existing processing techniques can be used as processing forms of the image down-sampling process (reduction process) in the down-sampling processors 311 and 312 and the image up-sampling process (expansion process) in the up-sampling processor 313.

FIG. 11 shows examples of processing techniques that can be applied to an image down-sampling process (reduction process) in the down-sampling processors 311 and 312. In the down-sampling processors 311 and 312, for example, as shown in FIG. 11, an averaging technique, a low-pass filter (LPF) application technique, a sub-sampling technique, a median value application technique, or the like can be used.

The averaging technique is a technique in which, first, the reduction ratio of the image is determined, and each pixel value of the reduced image is set by using the average feature quantity in the area to be reduced. As a result, pixels containing noise can be smoothed, and the influence of the noise is decreased. The low-pass filter (LPF) application technique is a technique in which a low-pass filter (LPF) is used to perform image reduction. Smoothing is performed for not only an area to be reduced, but also pixels in the periphery thereof in accordance with the size of the window of the filter. In this process, the amount of noise can be decreased similarly to the averaging technique.

The sub-sampling technique is a technique in which the average or a median value of one point or several points within the area of the original image corresponding to the pixels of the reduced image is set as the pixel value of the reduced image. The features of this process are that the number of calculations can be greatly decreased because only several points within the reduction area are used. The intermediate value (median value) application technique is a technique in which a median value within an area or a block of the original image corresponding to the pixels of the reduced image is set as the pixel value of the reduced image. The features of this process are that even if several pixel values are greatly apart from the other pixel values due to impulse noise, an effective value can be set as the pixel value of the reduced image.

In the down-sampling processors 311 and 312, for example, by adopting one of the processing techniques shown in FIG. 11, the reduced images of the current image and the motion compensated image (MC image) are generated, and the generated reduced images are input to the addition determination unit 304.

Additionally, FIG. 12 shows an example of the up-sampling (expansion process) processing technique that can be used in the up-sampling processor 313 for performing an up-sampling process on an addition coefficient map generated by the addition determination unit 304.

For the up-sampling (expansion process) processing technique that can be used in the up-sampling processor 313, as shown in FIG. 12, one of a nearest neighbor method, a bi-linear method, a bi-cubic method, a linear interpolation and LPF application process, and a technique in which the maximum value and the minimum value of a fixed area is used.

In the nearest neighbor method, as shown in part (a) of FIG. 13, as the pixel value of the pixel that is added when the image is expanded, the value of the pixel closest from the pixel forming the reduced image is copied. The object to be expanded by the up-sampling processor 313 in the present embodiment is a map formed from the addition weights (=addition coefficients) corresponding to the respective pixels, and thus the pixel value corresponds to an addition weight (=addition coefficient).

In the bi-linear method, the pixel value of the pixel to be added in the expansion image is determined by sampling four peripheral pixels contained in the reduced image and performing linear interpolation. In this example, the pixel value corresponds to an addition weight (=addition coefficient).

The bi-cubic method is a technique in which the pixel value of the pixel to be added in the expansion image is subjected to weighting in accordance with a distance from a plurality of pixels of the reduced image at the neighboring point, and filtering is performed thereon. In this example, the pixel value corresponds to an addition weight (=addition coefficient).

The linear interpolation and LPF application process is a technique in which the pixel value of the pixel to be added in an expansion image is set at 0, linear interpolation is performed using the pixel values of the pixels contained in a reduced image, and the signal is passed through a low-pass filter (LPF) by using a Nyquist frequency as a cut-off frequency so as to determine the pixel value. In this example, the pixel value corresponds to an addition weight (=addition coefficient).

The technique in which the maximum value or the minimum value in a fixed area is used is a technique in which the maximum value or the minimum value in a certain area of the reduced image is set as the total pixel values in the area corresponding to the expansion image. Part (b) of FIG. 13 shows a technique in which the maximum value in a fixed area is used. In this example, the pixel value corresponds to an addition weight (=addition coefficient).

In a case where an addition coefficient map in which an addition weight (=addition coefficient) is set by performing up-sampling by using the maximum value of the area as the pixel value in the area is generated, the addition coefficient is set to be large, and the addition ratio of the motion compensated image (MC image) with respect to the current image is increased. On the other hand, in a case where the minimum value is used, in contrast, the ratio of the current image is increased.

(2b) Image processing apparatus (second embodiment) that performs addition determination process using success determination information on motion estimation (ME)

Next, a description will be given below, with reference to FIG. 14 and subsequent figures, of an image processing apparatus (second embodiment) that performs an addition determination process using success determination on motion estimation (ME).

The addition determination process in which the success determination information on the motion estimation (ME) according to the second embodiment of the present invention is used can be applied as the process of the addition determination unit 304 inside the image processing apparatus 300 shown in FIG. 9. Furthermore, the addition determination process can also be applied as the process of the addition determination unit 14 of the image processing apparatus 10 shown in FIG. 1 in which a reduced image is not used. In the following, a description will be given of a case in which the addition determination process is applied as the process of the addition determination unit 304 in the image processing apparatus 300 shown in FIG. 9.

As described earlier with reference to FIG. 8, in a case where the pixel values of the corresponding pixels of the current image and the motion compensated image (MC image) differ, the addition determination unit 304 of the image processing apparatus 300 of the present embodiment determines whether the difference is a difference generated resulting from an incorrect (deteriorated) motion compensated image (MC image) due to motion estimation (ME) failure or is a difference due to strong noise, and computes an optimum addition weight.

Figure 14:
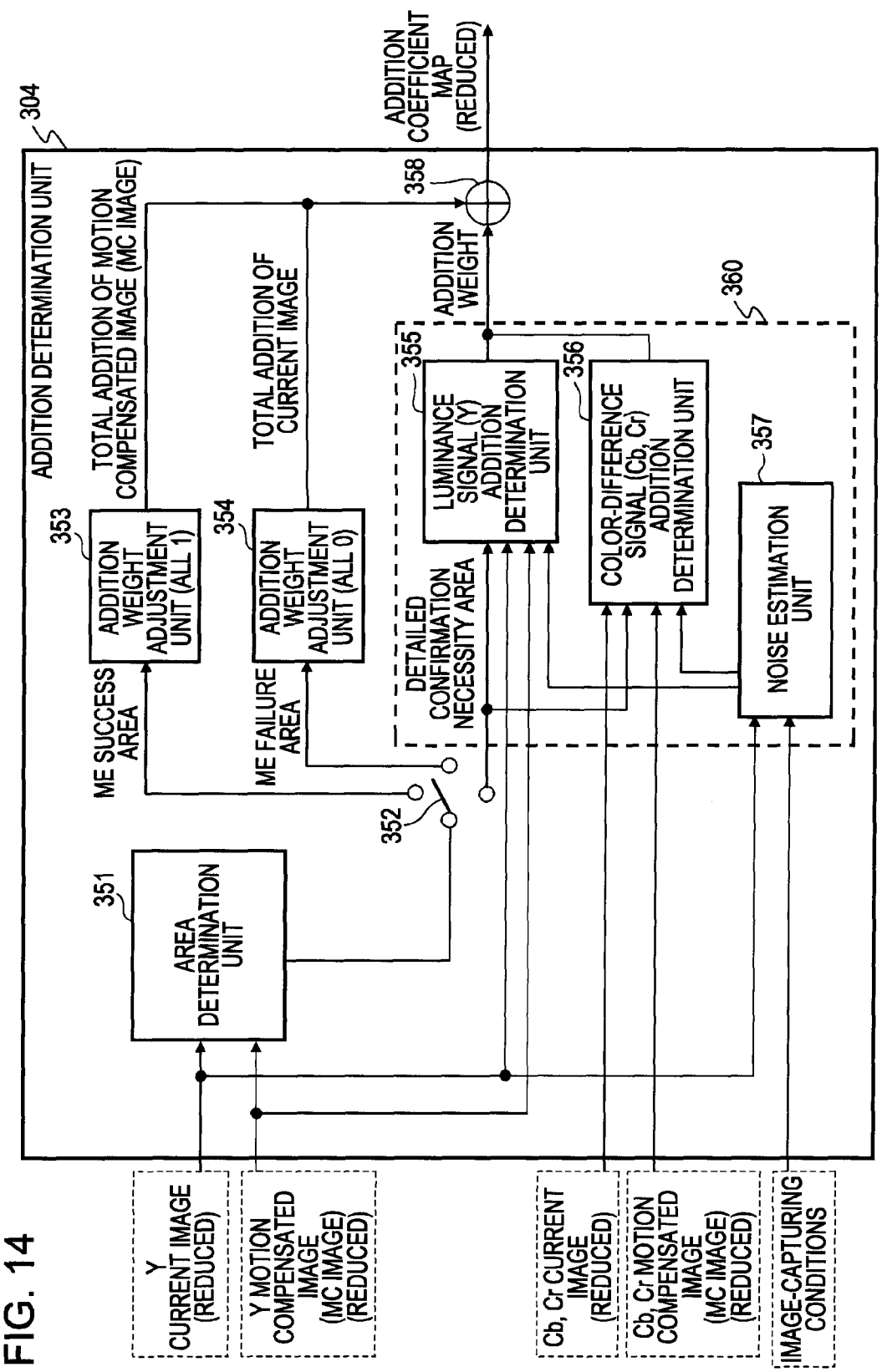
FIG. 14 illustrates an example of the configuration of an addition determination unit that performs an addition determination process in which success determination information on motion estimation (ME) is used.

The addition determination unit 304 of the image processing apparatus 300 of the present embodiment, as shown in FIG. 14, includes an area determination unit 351, a switching unit (switch) 352, an addition weight adjustment unit (all 1) 353, an addition weight adjustment unit (all 0) 354, a luminance signal (Y) addition determination unit 355, a color-difference signal (Cb, Cr) addition determination unit 356, a noise estimation unit 357, and a computation unit 358.

A processing block 360 is constituted by the luminance signal (Y) addition determination unit 355, the color-difference signal (Cb, Cr) addition determination unit 356, and the noise estimation unit 357. The processing block 360 has the same configuration as the configuration of the addition determination unit 14 described earlier with reference to FIG. 4 and performs the same processing as that described with reference to FIG. 4. However, in the present embodiment, a reduced image is input, and an addition weight corresponding to the constituent pixels of the reduced image is generated and output. Each of the addition weight adjustment unit (all 1) 353, the addition weight adjustment unit (all 0) 354, and the processing block 360 functions as an addition weight setting unit that sets or computes an addition weight corresponding to the pixel in each area in accordance with the respective area attributes.

Figure 4:
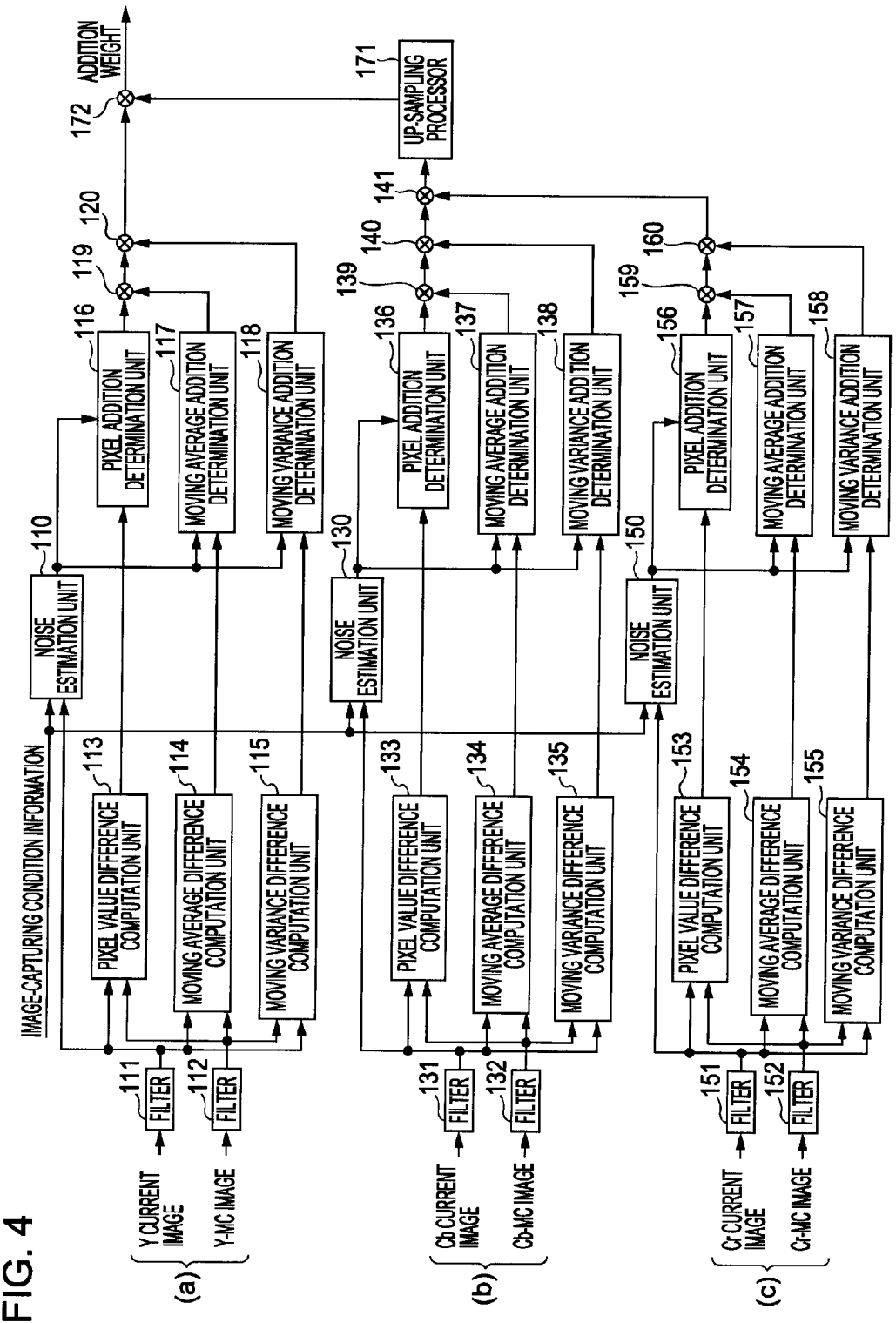
FIG. 4 illustrates a detail example of the configuration of an addition determination unit.

The luminance signal (Y) addition determination unit 355 has a configuration corresponding to part (a) of FIG. 4. The color-difference signal (Cb, Cr) addition determination unit 356 has a configuration corresponding to part (b) of FIG. 4. The noise estimation unit 357 corresponds to the noise estimation units 110, 130, and 150 in FIG. 4.

In the addition determination unit 304 according to the present embodiment, the area determination unit 351 receives the reduced current image and the reduced motion compensated image (MC image) and performs an area determination process in units of small areas (blocks) formed from a plurality of pixels forming the reduced image. More specifically, an area determination process for determining whether or not each area is a motion estimation (ME) success area, a motion estimation (ME) failure area, or a detailed confirmation necessity area for areas that are difficult to classify into either of the other two areas.

As described earlier, the motion estimation (ME) failure area is an area in which there are many pixels that indicate motion that does not match the motion vector generated by the motion prediction processor 302, that is, an area in which an object that moves specifically exists, and in which an incorrect (deteriorated) motion compensated image (MC image) was generated. More specifically, the motion estimation (ME) failure area is an area such as a small area 291 shown in FIG. 8 described earlier. The motion estimation (ME) success area is an area in which most of the pixels within the area are formed from the pixels that indicate a motion that approximately matches a motion vector generated by the motion prediction processor 302. The detailed confirmation necessity area is an intermediate area that is difficult classify into either of the other two areas.

The area determination unit 351 makes a determination, in units of small areas in which the reduced current image and motion compensated image (MC image) are divided, as to area attributes regarding which one of (a) motion estimation (ME) success area, (b) motion estimation (ME) failure area, and (c) detailed confirmation necessity area each area correspond to.

The determination information regarding each area is output to the addition weight adjustment unit 353, the addition weight adjustment unit 354, and the processing block 360 via the switching unit (switch) 352 on the basis of the determination result.

For example, when the area information on the "motion estimation (ME) success area" is output to the addition weight adjustment unit (all 1) 353, the addition weight adjustment unit (all 1) 353 sets all the addition weights corresponding to the pixels in the area to 1. The addition weight is an addition weight of the motion compensated image (MC image) for the current image and is set to a range of 0 to 1. The "addition weight=1" is a setting in which the weight of the pixel value of the motion compensated image (MC image) is set at 1, and means a setting in which the weight of the pixel value of the pixel corresponding to the current image is set at 0.

Furthermore, when the area information on the "motion estimation (ME) failure area" is output to the addition weight adjustment unit (all 0) 354, the addition weight adjustment unit (all 0) 354 sets all the addition weights corresponding to the pixels in the area to 0. The "addition weight=0" is a setting in which the weights of the pixel values of the motion compensated image (MC image) are set to 0, and the weights of the pixel value corresponding to the pixels of the current image are set to 1.

The area information on the other detailed confirmation necessity area is output to the processing block 360. The processing block 360 performs the same processing as that described earlier with reference to FIG. 4 on only the constituent pixels of the detailed confirmation necessity area. However, the processing is performed as a process on the reduced image.

As a result, the addition weight adjustment unit 353 outputs information in which the addition weight=1 to only the "motion estimation (ME) success area". The addition weight adjustment unit 354 outputs information in which the addition weight=0 to only the "motion estimation (ME) success area", and the processing block 360 outputs an addition weight in accordance with the processing described earlier with reference to FIG. 4 to only the other "detailed confirmation necessity area". The computation unit 358 adds up all the addition weights corresponding to these areas, and creates and outputs an addition coefficient map formed from the addition weights corresponding to the constituent pixels of the entire reduced image area. This addition coefficient map is a map formed from the addition weight information for the constituent pixels of the reduced image. This map is expanded to the same size as those of the original current image and the original motion compensated image (MC image) in the upsampling processor 313 shown in FIG. 9. The expanded addition coefficient map is input to the addition processor, whereby a process for adding the current image and the motion compensated image (MC image) is performed in accordance with the addition weight.

Figure 15:
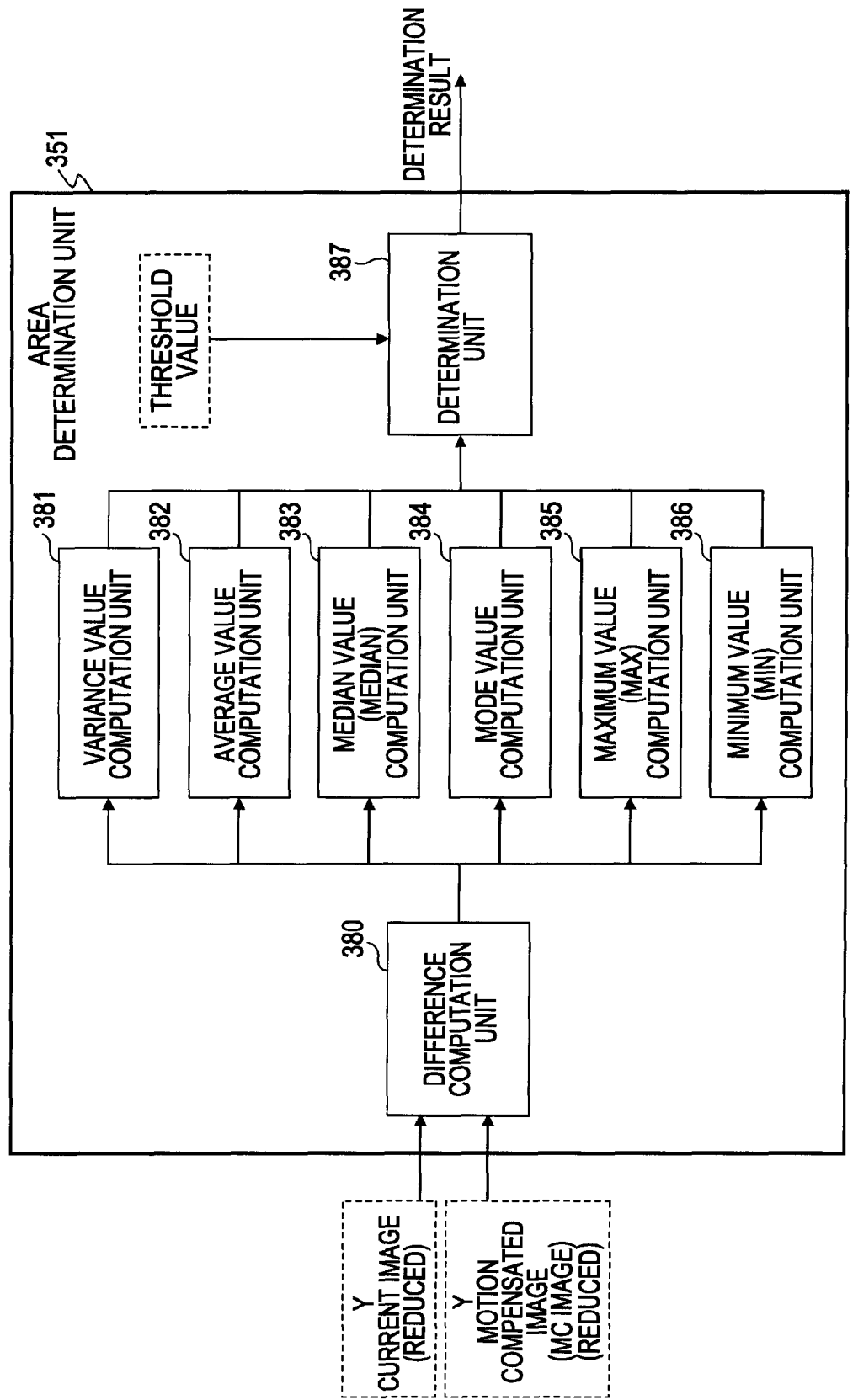
FIG. 15 illustrates examples of the configuration and the processing of an area determination unit of the addition determination unit that performs an addition determination process in which success determination information on motion estimation (ME) is used.

Examples of the configuration and the processing of the area determination unit 351 will be described below with reference to FIG. 15 and subsequent figures. FIG. 15 shows an example of the configuration of the area determination unit 351. The area determination unit 351 shown in FIG. 15 includes a difference computation unit 380, a variance value computation unit 381, an average value computation unit 382, a median value computation unit 383, a mode value computation unit 384, a maximum value (max) computation unit 385, a minimum value (min) computation unit 386, and a determination unit 387.

It is possible for each of the variance value computation unit 381, the average value computation unit 382, the median value computation unit 383, the mode value computation unit 384, the maximum value (max) computation unit 385, and minimum value (min) computation unit 386 to individually output an index value with which a determination is made as to which one of (a) motion estimation (ME) success area, (b) motion estimation (ME) failure area, and (c) detailed confirmation necessity area each area belongs to. Therefore, the area determination unit 351 may be configured to have a configuration having only one of these, or may be configured to have a configuration having a plurality of processors so that the determination unit 387 obtains a plurality of index values so as to make a determination in a comprehensive manner. Alternatively, the area determination unit 351 may be configured to make a determination by selectively using an index value for the processor, the index value differing according to the area.

The difference computation unit 380 receives the pixel value information for a corresponding small area at a corresponding position of each of the current image and the motion compensated image (MC image). Both of them are reduced images. Furthermore, the present embodiment is set in such a manner that the luminance values (Y) of these images are input, and the pixel values rather than the luminance values may be input.

Here, a description will be given by assuming that the luminance values (Y) of the constituent pixels of the corresponding small area of the reduced current image and the reduced motion compensated image (MC image) have been input. The difference computation unit 380 computes a luminance value (Y) difference in the constituent pixels of the corresponding small areas of the current image and the motion compensated image (MC image), and outputs the luminance value (Y) difference to the variance value computation unit 381, the average value computation unit 382, the median value computation unit 383, the mode value computation unit 384, the maximum value (max) computation unit 385, and the minimum value (min) computation unit 386.

As described earlier, it is possible for the variance value computation units 381 through the minimum value (min) computation unit 386 to individually output an index value with which it is determined which one of (a) motion estimation (ME) success area, (b) motion estimation (ME) failure area, and (c) detailed confirmation necessity area the small area belongs to.

First, the process of the variance value computation unit 381 will be described. The variance value computation unit 381 computes a variance of the luminance value (Y) differences of the constituent pixels of the corresponding small areas of the current image and the motion compensated image (MC image), which are input from the difference computation unit 380.

On the basis of the variance of the differences generated by the variance value computation unit 381, the determination unit 387 determines which one of (a) motion estimation (ME) success area, (b) motion estimation (ME) failure area, and (c) detailed confirmation necessity area each area belongs to.

Figure 16:
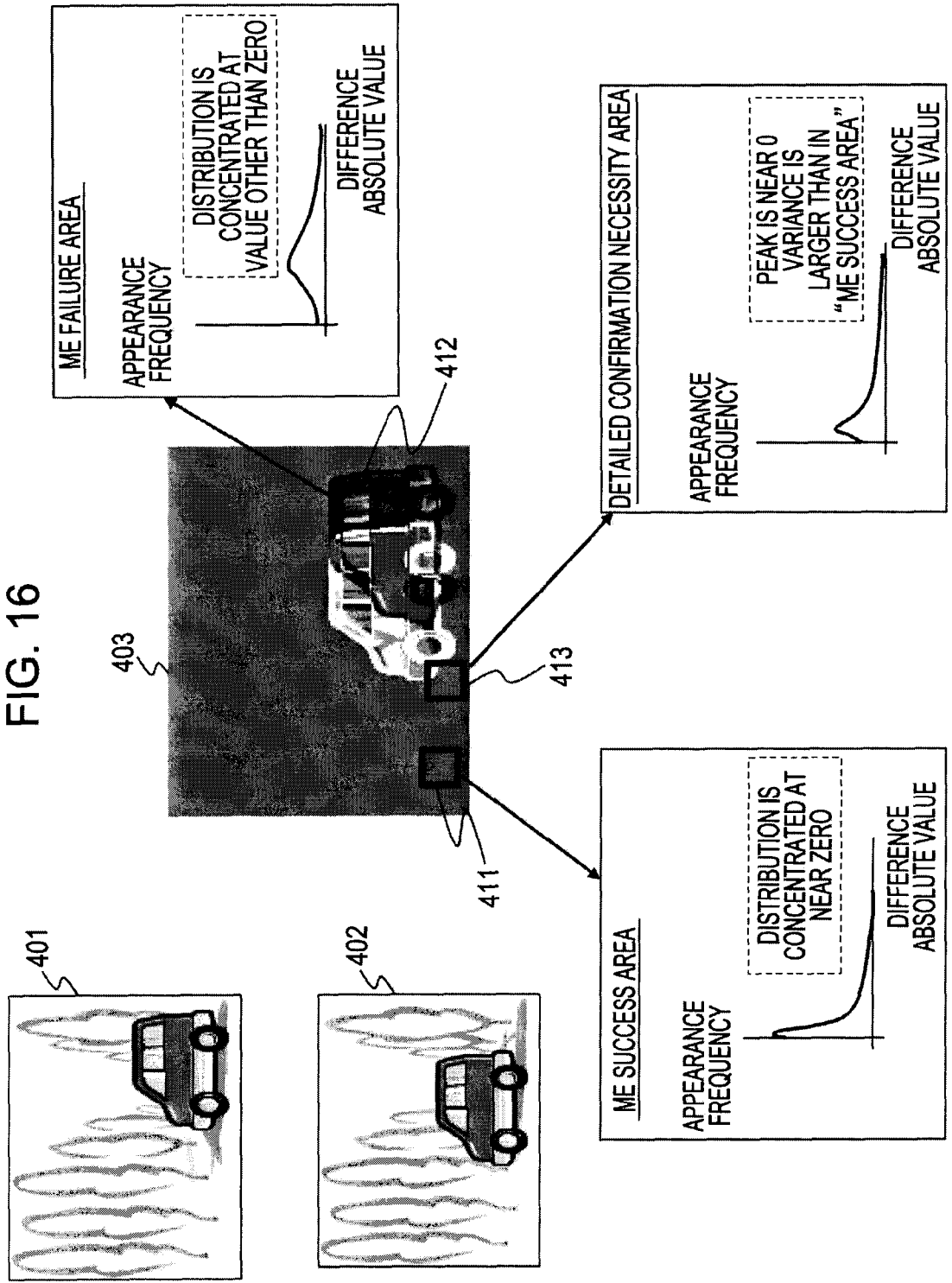
FIG. 16 illustrates a determination process based on the variance of pixel value (luminance value) differences.

A description will be given, with reference to FIG. 16, of a determination process based on a variance of pixel value (luminance value) differences. FIG. 16 shows a current image 401, a motion compensated image (MC image) 402, and a difference image 403 formed from the luminance value differences of these images.

For the difference image 403, a motion estimation (ME) success area 411, a motion estimation (ME) failure area 412, and a detailed confirmation necessity area 413 intermediate between the other two areas are shown. FIG. 16 shows distribution data of difference absolute values corresponding to these areas. As is understood from the difference absolute value distribution data shown in the figure, the following tendencies are shown.

The distribution of the difference absolute value distribution data of the motion estimation (ME) success area 411 concentrates in the vicinity of 0.

The distribution of the difference absolute value distribution data of the motion estimation (ME) failure area 412 concentrates at a value other than 0.

The peak of the difference absolute value distribution data of the detailed confirmation necessity area 413 is near 0, and the variance thereof is increased to more than that in the motion estimation (ME) success area.

The determination unit 387 makes a determination as to these three area by the comparison with a preset threshold value.

The average value computation unit 382 computes an average value of the luminance value (Y) differences of the constituent pixels of the corresponding small areas of the current image and the motion compensated image (MC image), which are input from the difference computation unit 380. The value of the difference average value becomes the greatest value in (b) motion estimation (ME) failure area, becomes the smallest value in (a) motion estimation (ME) success area, and becomes a value intermediate between the other two values in (c) detailed confirmation necessity area.

The determination unit 387 compares the difference average value computed by the average value computation unit 382 with the preset threshold value so as to determine which one of (a) motion estimation (ME) success area, (b) motion estimation (ME) failure area, and (c) detailed confirmation necessity area each area belongs to.

The median value computation unit 383 computes an intermediate value of luminance value (Y) differences of the constituent pixels of the corresponding small areas of the current image and the motion compensated image (MC image), which are input from the difference computation unit 380. The value of the difference intermediate value also becomes the greatest value in (b) motion estimation (ME) failure area, becomes the smallest value in (a) motion estimation (ME) success area, and becomes a value intermediate between the other two values in (c) detailed confirmation necessity area.

The determination unit 387 compares the difference intermediate value computed by the median value computation unit 383 with the preset threshold value so as to determine which one of (a) motion estimation (ME) success area, (b) motion estimation (ME) failure area, and (c) detailed confirmation necessity area each area belongs to.

The mode value computation unit 384 computes a mode value of the luminance value (Y) differences of the constituent pixels of the corresponding small area of the current image and the motion compensated image (MC image), which are input from the difference computation unit 380. The value of the mode value also becomes the largest mode value in (b) motion estimation (ME) failure area, becomes the smallest value in (a) motion estimation (ME) success area, and becomes a value intermediate between the other two values in (c) detailed confirmation necessity area.

The determination unit 387 compares the difference mode value computed by the mode value computation unit 384 with the preset threshold value so as to determine which one of (a) motion estimation (ME) success area, (b) motion estimation (ME) failure area, and (c) detailed confirmation necessity area each area belongs to.

The maximum value (max) computation unit 385 computes a maximum value (max) of the luminance value (Y) differences of the constituent pixels of the corresponding small areas of the current image and the motion compensated image (MC image), which are input from the difference computation unit 380. The value of the maximum value (max) also becomes the greatest value in (b) motion estimation (ME) failure area, becomes the smallest value in (a) motion estimation (ME) success area, and becomes a value intermediate between the other two values in (c) detailed confirmation necessity area.

The determination unit 387 compares the difference maximum value (max) computed by the maximum value (max) computation unit 385 with a preset threshold value so as to determine which one of (a) motion estimation (ME) success area, (b) motion estimation (ME) failure area, and (c) detailed confirmation necessity area each area belongs to.

The minimum value (min) computation unit 386 computes a minimum value (min) of the luminance value (Y) differences of the constituent pixels of the corresponding small areas of the current image and the motion compensated image (MC image), which are input from the difference computation unit 380. The value of the minimum value (min) also becomes the greatest value in (b) motion estimation (ME) failure area, becomes the smallest value in (a) motion estimation (ME) success area, and becomes a value intermediate between the other two values in (c) detailed confirmation necessity area.

The determination unit 387 compares the difference minimum value (min) computed by the minimum value (min) computation unit 386 with a preset threshold value so as to determine which one of (a) motion estimation (ME) success area, (b) motion estimation (ME) failure area, and (c) detailed confirmation necessity area each area belongs to.

As described earlier, the determination unit 387 may make an area determination by individually using an index value output by the variance value computation unit 381 through the minimum value (min) computation unit 386, or may combine two or more of the values and make an area determination.

Figure 17:
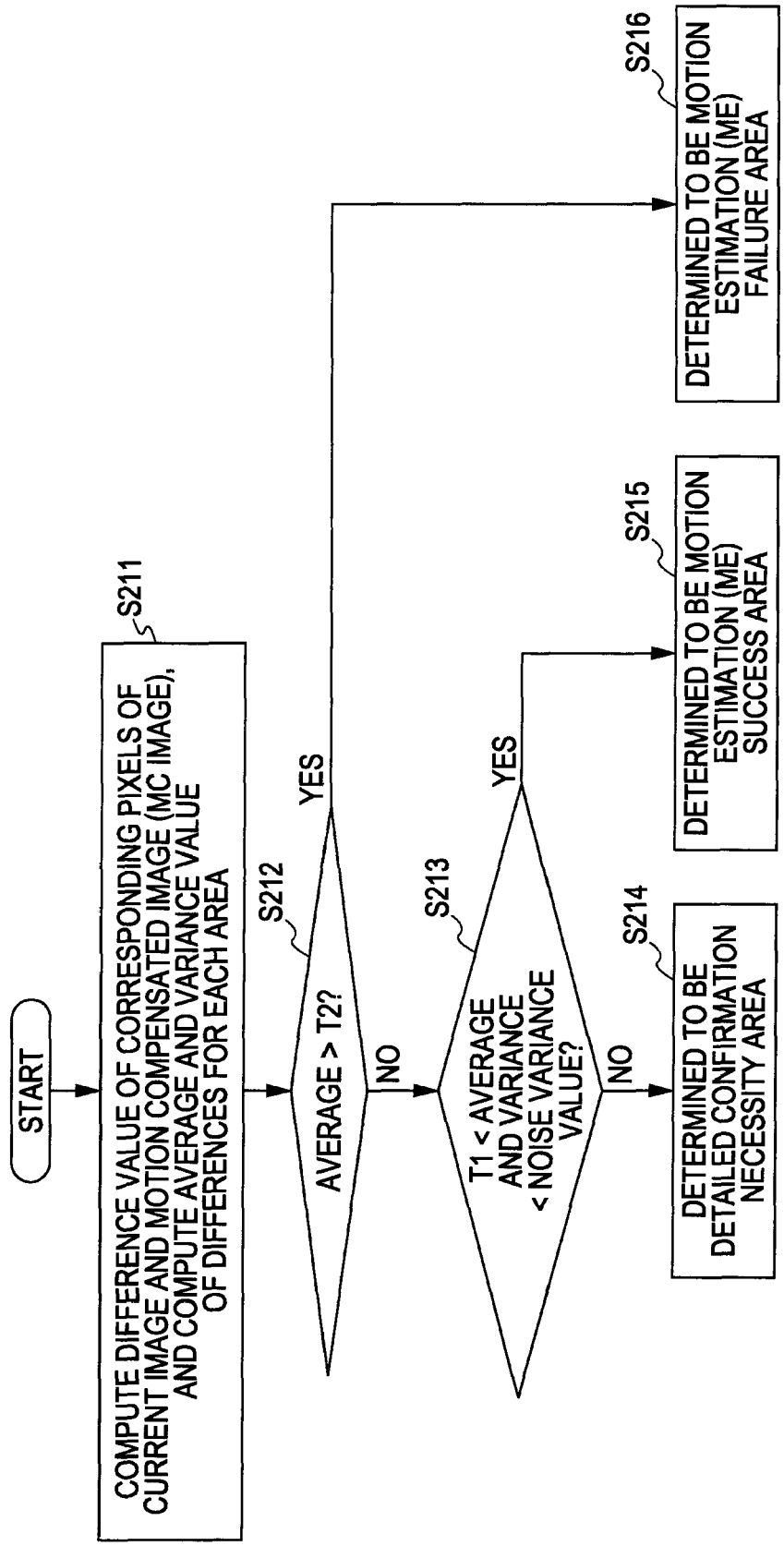
FIG. 17 is a flowchart illustrating an example of the sequence of an area determination process in an area determination unit set inside an addition determination unit.

FIG. 17 is a flowchart showing an example of an area determination process in the area determination unit 351. This flowchart shows a processing sequence in which the determination unit 387 uses the difference variance value generated by the variance value computation unit 381 and the difference average value generated by the average value computation unit 382 so as to determine which one of (a) motion estimation (ME) success area, (b) motion estimation (ME) failure area, and (c) detailed confirmation necessity area each area belongs to.

The process of each step of the flowchart shown in FIG. 17 will be described. In step S211, a difference value of the corresponding pixels of the current image and the motion compensated image (MC image) is computed, and furthermore an average of the differences and the variance value are computed for each area. This process is performed by the difference computation unit 380, the variance value computation unit 381, and the average value computation unit 382.

Step S212 and subsequent steps are processes of the determination unit 387 and subsequent units. In step S212, the determination unit 387 compares a preset threshold value T2 with the difference average value generated by the average value computation unit 382.

When the following expression holds:

the difference average value>T2, the process proceeds to step S216, where this area is determined to be a "motion estimation (ME) failure area".

In step S212, when the following expression does not hold:

the difference average value>T2, the process proceeds to step S213. In step S213, a process for comparing a preset threshold value T1 with the difference average value generated by the average value computation unit 382, and a process for comparing the difference variance value generated by the variance value computation unit 381 with the preset threshold value or a noise variance value computed on the basis of the image are performed. That is, a determination process in accordance with the following two expressions is performed:

T1<the difference average value, and the difference variance value<the noise variance value.

When these two expressions hold, the process proceeds to step S215, where this area is determined to be a "motion estimation (ME) success area".

In step S213, when the following two expressions do not hold:

T1<difference average value, and the difference variance value<the noise variance value, the process proceeds to step S214, where this area is determined to be a "detailed confirmation necessity area".

Figure 18:
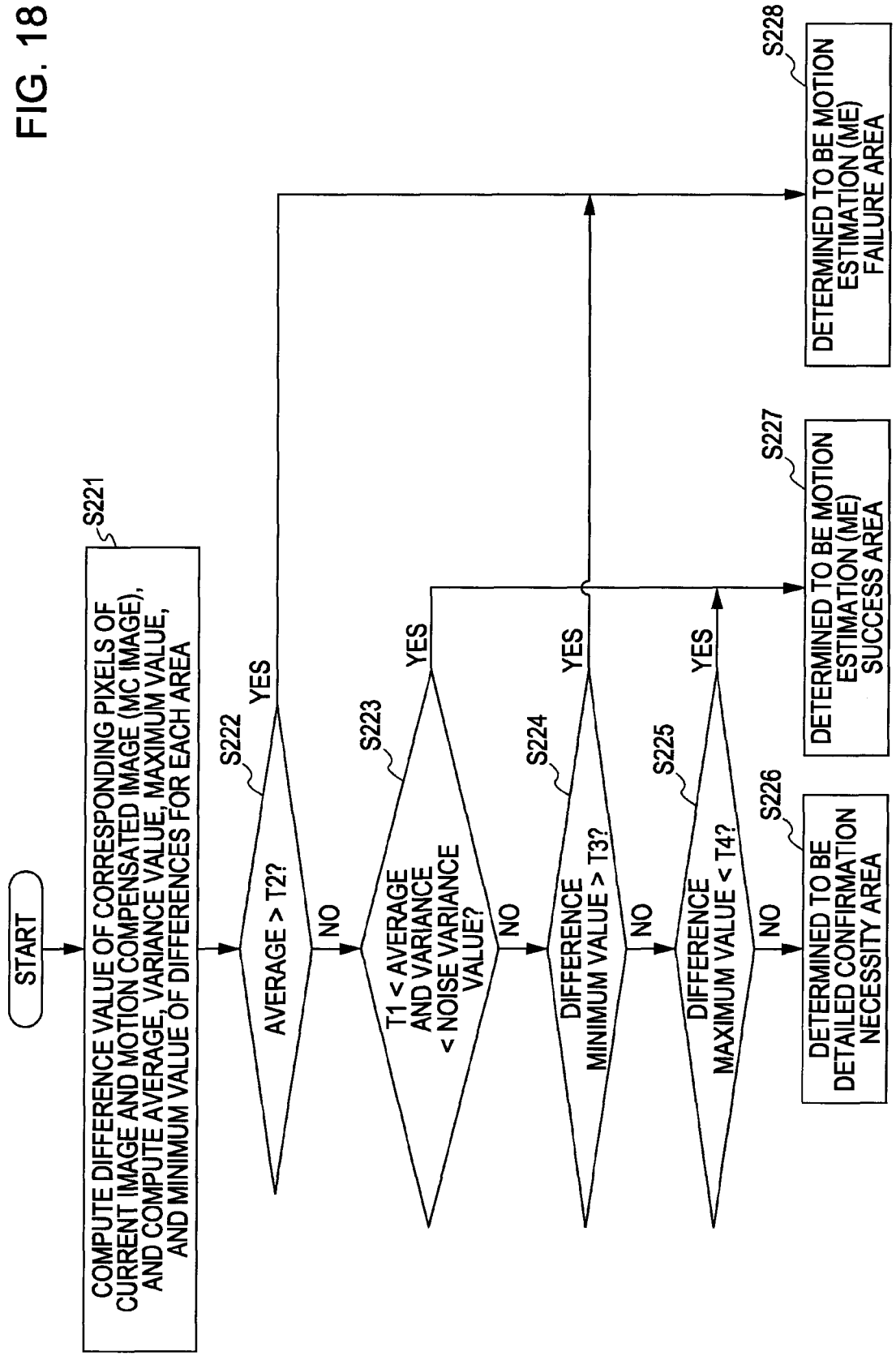
FIG. 18 is a flowchart illustrating an example of the sequence of an area determination process in an area determination unit set inside an addition determination unit.

FIG. 18 is a flowchart showing a different example of the processing of the area determination process in the area determination unit 351. This flowchart is a processing sequence in which the determination unit 387 uses the difference variance value generated by the variance value computation unit 381, the difference average value generated by the average value computation unit 382, the difference maximum value generated by the maximum value (max) computation unit 385, and the difference minimum value computed by the minimum value (min) computation unit 386 so as to determine which one of (a) motion estimation (ME) success area, (b) motion estimation (ME) failure area, and (c) detailed confirmation necessity area each area belongs to.

The process of each step of the flowchart shown in FIG. 18 will be described. In step S221, a difference value of the corresponding pixels of the current image and the motion compensated image (MC image) is computed, and furthermore an average value of differences, a variance value, a maximum value, and a minimum value are computed for each area. This process is performed by the difference computation unit 380, the variance value computation unit 381, the average value computation unit 382, the maximum value (max) computation unit 385, and the minimum value (min) computation unit 386.

Step S222 and subsequent steps are processes of the determination unit 387. In step S222, the determination unit 387 compares the preset threshold value T2 with the difference average value generated by the average value computation unit 382.

When the following expression hold:

the difference average value>T2, the process proceeds to step S228, where this area is determined to be a "motion estimation (ME) failure area".

In step S222, when the following expression does not hold:

the difference average value>T2, the process proceeds to step S223. In step S223, a process for comparing the preset threshold value T1 with the difference average value generated by the average value computation unit 382, and a process for comparing the difference variance value generated by the variance value computation unit 381 with the preset threshold value or a noise variance value computed on the basis of the image are performed. That is, a determination process in accordance with the following two expressions is performed:

T1<the difference average value, and the difference variance value<the noise variance value. When these two expressions hold, the process proceeds to step S227, where this area is determined to be a "motion estimation (ME) success area".

In step S223, when the following two expressions do not hold:

T1<the difference average value, and the difference variance value<the noise variance value, the process proceeds to step S224.

In step S224, the determination unit 387 compares a preset threshold value T3 with the difference minimum value generated by the minimum value (min) computation unit 386.

When the following expression holds:

the difference minimum value>T3, the process proceeds to step S228, where this area is determined to be a "motion estimation (ME) failure area".

In step S224, when the following expression does not hold:

the difference minimum value>T3, the process proceeds to step S225.

In step S225, the determination unit 387 compares a preset threshold value T4 with the difference maximum value generated by the maximum value (max) computation unit 385.

When the expression of the difference maximum value<T4 holds, the process proceeds to step S227, where this area is determined to be a "motion estimation (ME) success area".

In step S225, when the following expression does not hold:

the difference maximum value<T4, the process proceeds to step S226, where this area is determined to be a "detailed confirmation necessity area".

Figure 19:
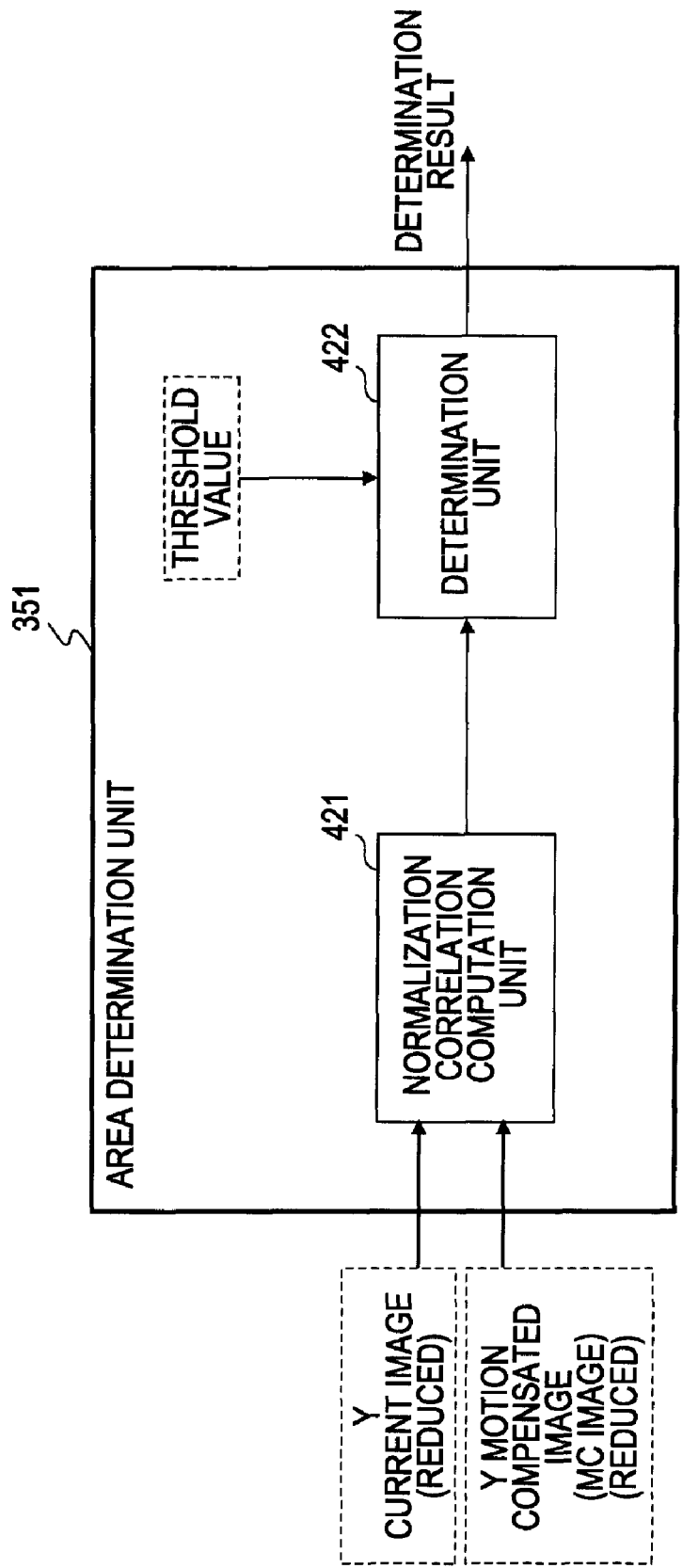
FIG. 19 illustrates examples of the configuration and the processing of an area determination unit of an addition determination unit that performs an addition determination process in which success determination information on motion estimation (ME) is used.

FIG. 19 shows another example of the area determination unit 351. The area determination unit 351 shown in FIG. 19 includes a normalization correlation computation unit 421 and a determination unit 422. The normalization correlation computation unit 421 receives pixel value information on corresponding small areas at positions corresponding to the current image and the motion compensated image (MC image). The normalization correlation computation unit 421 computes a normalization correlation of the corresponding small areas of the current image and the motion compensated image (MC image).

The determination unit 422 compares the normalization correlation value corresponding to the area, which is computed by the normalization correlation computation unit 421, with a preset threshold value so as to determine which one of (a) motion estimation (ME) success area, (b) motion estimation (ME) failure area, and (c) detailed confirmation necessity area the area belongs to.

In the "motion estimation (ME) success area", the pixel values of the corresponding small areas of the current image and the motion compensated image (MC image) are nearly equally distributed, and the normalization correlation is increased. On the other hand, the normalization correlation of the "motion estimation (ME) failure area" is decreased. On the basis of this tendency, the determination unit 422 determines which one of (a) motion estimation (ME) success area, (b) motion estimation (ME) failure area, and (c) detailed confirmation necessity area the area belongs to.

The normalization correlation value [NC(A, B)] of the current image A and the motion compensated image (MC image) B, which is computed by the normalization correlation computation unit 421, can be computed in accordance with the following expression.

$$NC(A,B)=\text{Sum}(A(i) \times B(i))/(\text{Sqrt}(\text{Sum}(A(i) \times A(i))) \times \text{Sqrt}(\text{Sum}(B(i) \times B(i))))$$

In the above expression,

A(i) is the pixel value (or the luminance value) of the image area A,

B(i) is the pixel value (or the luminance value) of the image area B,

Sum: the addition value, and

Sqrt: the square root.

The determination unit 422 compares the normalization correlation [NC(A, B)] corresponding to each area, which was computed in accordance with the above expression, with preset threshold values T5 and T6 so as to perform, for example, an area determination process such as the following:

an area where the determination expression of NC(A, B)>T5 holds is determined to be (a) a motion estimation (ME) success area, an area in which the determination expression of NC(A, B)<T6 holds is determined to be (b) a motion estimation (ME) failure area, and the other area is determined to be (c) a detailed confirmation necessity area.

The configuration shown in FIG. 19 shows an example in which area determination is made on the basis of only a normalization correlation value. Alternatively, the configuration shown in FIG. 19 and the configuration shown in FIG. 15 may be combined, so that at least one of the outputs of the variance value computation units 381 through the minimum value (min) computation unit 386 shown in FIG. 15 and the output of the normalization correlation computation unit 421 shown in FIG. 19 are combined, and an area determination process is performed.

Figure 20:
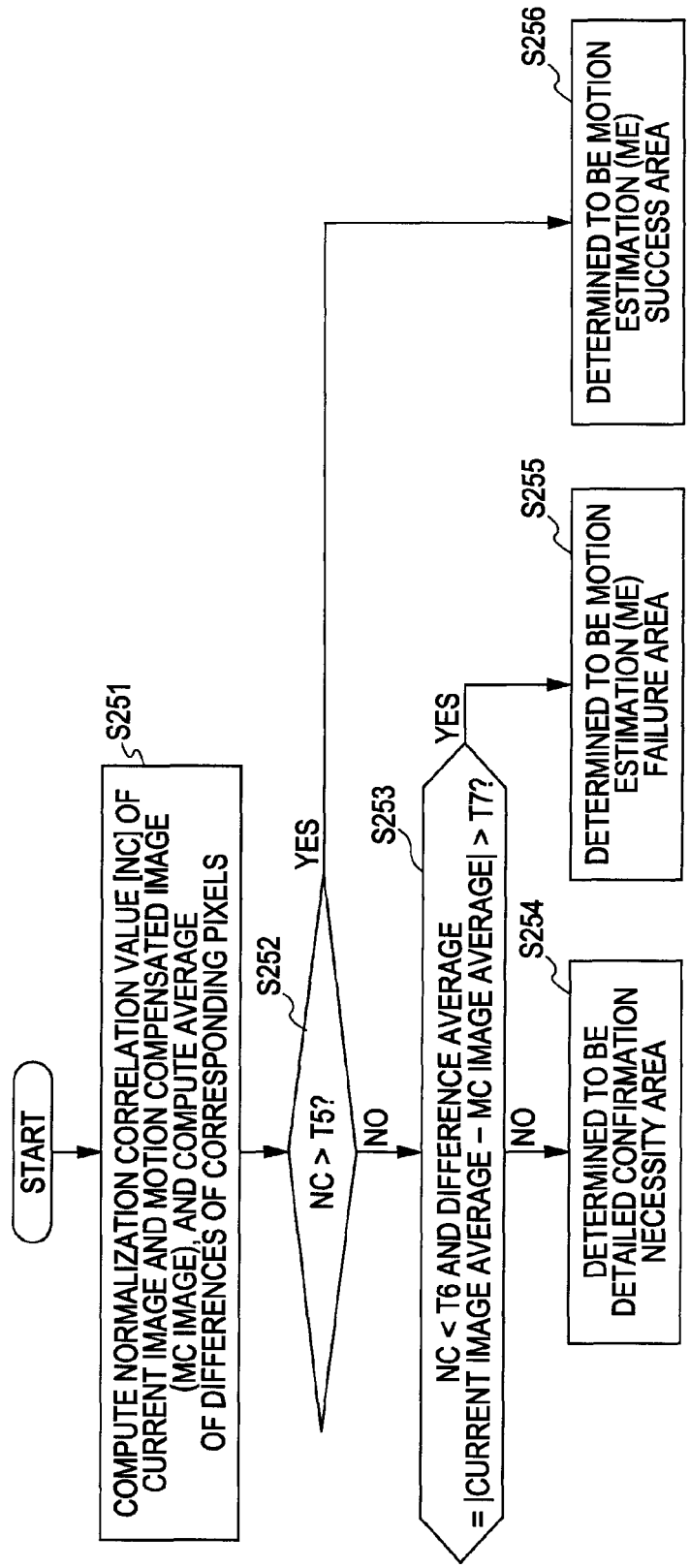
FIG. 20 is a flowchart illustrating an example of the sequence of an area determination process in an area determination unit set inside an addition determination unit.

A flowchart shown in FIG. 20 is a flowchart in which a difference average value generated by the average value computation unit 382 shown in FIG. 15 is combined with the output of the normalization correlation computation unit 421, and an area determination process is performed.

The process of each step of the flowchart shown in FIG. 20 will be described. In step S251, a normalization correlation of the corresponding areas of the current image and the motion compensated image (MC image) is computed, and furthermore a difference average value of the constituent pixels of the corresponding areas is computed. This process is performed as a process using the difference computation unit 380 and the average value computation unit 382 shown in FIG. 15, and the normalization correlation computation unit 421 shown in FIG. 19.

Step S252 and subsequent steps are processes of the determination unit. In step S252, the determination unit compares the preset threshold value T5 with a normalization correlation [NC] computed by the normalization correlation computation unit 421 shown in FIG. 19.

When the following expression holds:

NC>T5, the process proceeds to step S256, where this area is determined to be a "motion estimation (ME) success area".

In step S252, when the following expression does not hold:

NC>T5, the process proceeds to step S253. In step S253, a process for comparing the preset threshold value T6 with the normalization correlation [NC] computed by the normalization correlation computation unit 421 shown in FIG. 19, and a process for comparing a preset threshold value T7 with the difference average value generated by the average value computation unit 382 shown in FIG. 15 are performed. That is, it is determined whether or not the following two expressions hold:

NC>T6, and the difference average=|the current image average−the motion compensated image (MC image) average|>T7.

When the above two expressions hold, the process proceeds to step S255, where this area is determined to be a "motion estimation (ME) failure area".

In step S253, when the following two expressions do not hold,

NC>T6, and the difference average=|the current image average−the motion compensated image (MC image) average|>T7, the process proceeds to step S254, where this area is determined to be a "detailed confirmation necessity area".

As described above, in the image processing apparatus 300 in accordance with the present embodiment, that is, in the image processing apparatus 300 shown in FIG. 9, the addition determination unit 304 performs a process for the reduced image so as to realize speeding up of processing.

Furthermore, the addition determination unit 304 determines, in units of small areas in which a reduced image is divided, which one of (a) motion estimation (ME) success area, (b) motion estimation (ME) failure area, and (c) detailed confirmation necessity area each small area belongs to, and sets, on the basis of the determination result, an addition weight by using the configuration shown in FIG. 14.

That is, regarding the "motion estimation (ME) success area", the addition weight adjustment unit (all 1) 353 sets that the addition weight=1. Regarding the "motion estimation (ME) failure area", the addition weight adjustment unit (all 0) 354 sets that the addition weight=0. Regarding the "detailed confirmation necessity area", the processing block 360 performs processing described earlier with reference to FIG. 4 so as to compute an addition weight corresponding to each pixel.

These processing results are totaled, and an addition coefficient map in which the addition weights corresponding to the pixels are set is generated. As a result of such processing, a process in which the motion estimation (ME) success area and the failure area are distinguished is made possible, and setting of addition weights with high accuracy, which is effective for reducing noise, is made possible.

The addition coefficient map generated by the addition determination unit 304 is input to the up-sampling processor 313. The up-sampling processor 313 performs a process for expanding the addition coefficient map generated by the addition determination unit 304 to the same number of pixels as those of the original current image and the original motion compensated image (MC image). The up-sampling processor 313 outputs the expanded addition coefficient map to the addition processor 305.

The addition processor 305 performs a process for adding the current image and the motion compensated image (MC image) by using an addition weight calculated for each of the corresponding pixels. The process of the addition processor 305 is the same process as that described earlier with reference to FIGS. 1 and 6. That is, a weighted average of the current image and the motion compensated image (MC image) is calculated, and an addition process is performed.

(2c) Image processing apparatus (third embodiment) that performs addition determination process using discrimination information between noise and motion estimation (ME) failure area Next, a description will be given of an image processing apparatus that performs an addition determination process using discrimination information between noise and a motion estimation (ME) failure area according to a third embodiment of the present invention.

The image processing apparatus according to the third embodiment (to be described later) is configured in such a manner that when the addition determination unit is to compute an addition weight, a discrimination between a noise area and a motion estimation (ME) failure area, which were generated in a current image, a motion compensated image (MC image), or the like is performed, and control of an addition weight to be computed is performed.

Figure 21:
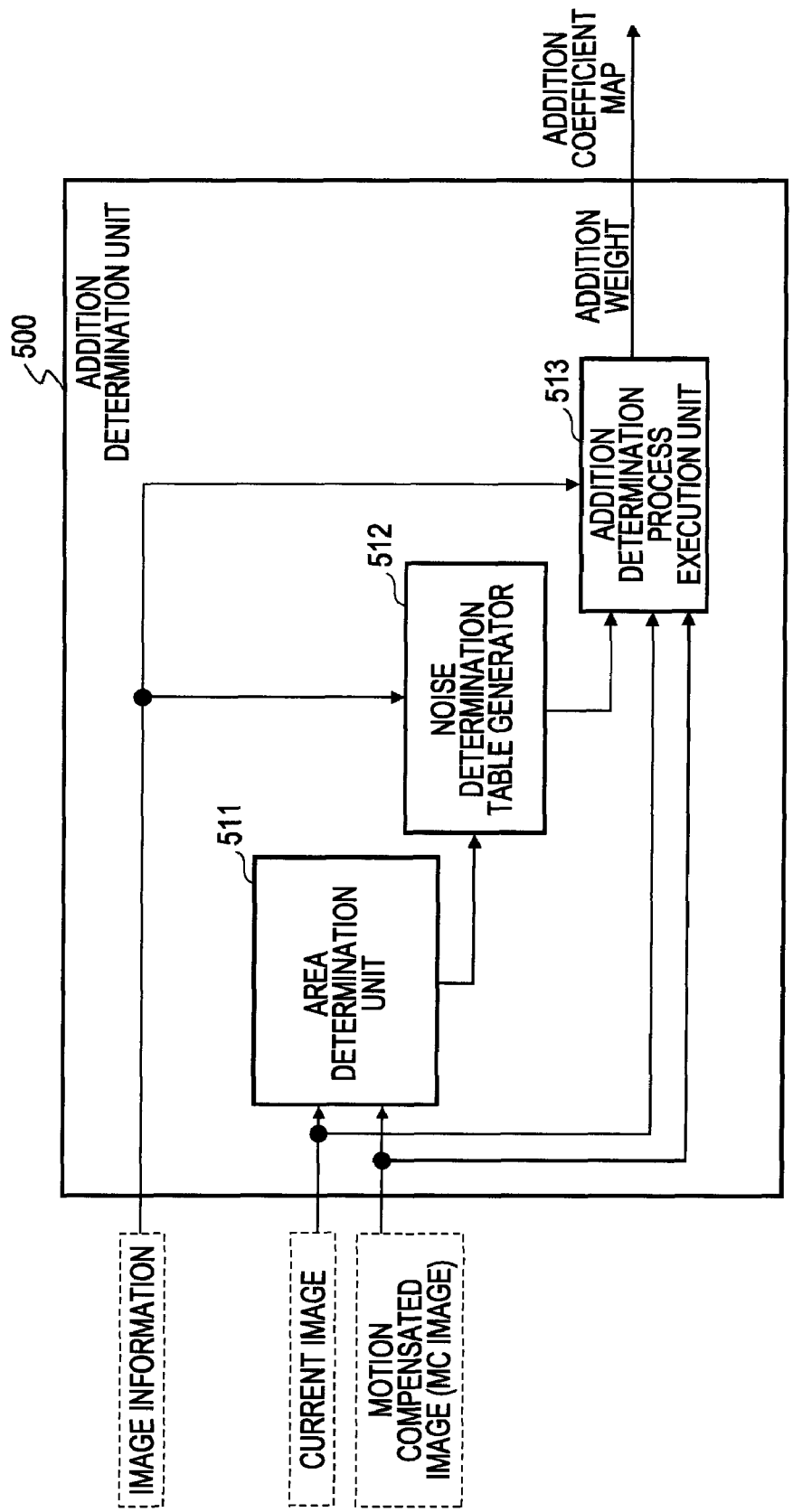
FIG. 21 illustrates an example of the configuration of an addition determination unit in an image processing apparatus according to a third embodiment of the present invention.

(2c-1) Example of Using Noise Determination Table in Accordance with Area Determination Result FIG. 21 shows the configuration of an addition determination unit 500 in the image processing apparatus of the present third embodiment. The addition determination unit 500 can be used as the addition determination unit 14 of the image processing apparatus 10 shown in FIG. 1 or the addition determination unit 304 of the image processing apparatus 300 shown in FIG. 9.

That is, an addition determination process to be described in the present third embodiment can also be used as the process of the addition determination unit 14 of the image processing apparatus 10 shown in FIG. 1, in which a reduced image is not used, and can be used as the process of the addition determination unit 304 in the image processing apparatus 300 shown in FIG. 9, in which a reduced image is used.

In the following, an example of the processing in a case where the addition determination unit 500 is used as the addition determination unit 14 in the image processing apparatus 10 shown in FIG. 1 will be described. As shown in FIG. 21, the addition determination unit 500 includes an area determination unit 511, a noise determination table generator 512, and an addition determination process execution unit 513.

In a case where the addition determination unit 500 shown in FIG. 21 is used as the addition determination unit 14 of the image processing apparatus 10 shown in FIG. 1, a current image is input from the frame memory 11 to the addition determination unit 500, and a motion compensated image (MC image) is input from the motion compensation processor 13 to the addition determination unit 500. Furthermore, image information (image-capturing conditions, etc.) is input to the addition determination unit 500 from, for example, a microcomputer inside a camera having the image processing apparatus 10. The image information is supplied from, for example, a microcomputer inside a camera. The image information contains information, such as the image-capturing mode, the exposure time period, and the gain, corresponding to an input image (captured image).

The area determination unit 511 receives the current image stored in the frame memory 11 and the motion compensated image (MC image) generated by the motion compensation processor 13. The area determination unit 511 performs the same area determination process as that described earlier in the second embodiment. That is, the area determination unit 511 has the same configuration as the area determination unit 351 in the addition determination unit 304 described with reference to FIG. 14, and performs the same processing.

As described earlier, in the process of the area determination unit 351, the area determination unit 511 receives the current image and the motion compensated image (MC image), and performs an area determination process in units of small areas (blocks) formed from a plurality of pixels forming the image. More specifically, an area determination process for determining which one of a motion estimation (ME) success area, a motion estimation (ME) failure area, and a detailed confirmation necessity area that is difficult to classify into either of the other two areas each area belongs to.

The area determination unit 511 determines, in units of areas in which the current image and the motion compensated image (MC image) are divided, which one of (a) motion estimation (ME) success area, (b) motion estimation (ME) failure area, and (c) detailed confirmation necessity area each area belongs to. The specific determination configuration is the same as that described with reference to FIGS. 15 to 20 in the process of the area determination unit 351 described earlier in the second embodiment.

The area determination unit 511 outputs, to the noise determination table generator 512, together with the position information on each area, the determination result in units of areas, that is, the determination result regarding which one of (a) motion estimation (ME) success area, (b) motion estimation (ME) failure area, and (c) detailed confirmation necessity area each area belongs to.

The noise determination table generator 512 generates a noise determination table that is used when the addition determination process execution unit 513 is to compute an addition weight of a pixel contained in each area. The noise determination table generator 512 receives the determination result of each area from the area determination unit 511, and generates a noise determination table corresponding to the area on the basis of the area determination result.

The noise determination table holds relation data between pixel values and the amount of noise. The table is used by the noise estimation unit that is set in the addition determination process execution unit 513. The addition determination process execution unit 513 has the same configuration as, for example, that of the addition determination unit described earlier with reference to FIG. 4.

As described earlier with reference to FIG. 4, the addition determination unit 14 shown in FIG. 4 includes the noise estimation units 110, 130, and 150. The noise estimation units 110, 130, and 150 are configured to have, as a table, data on the relation between luminance values measured in advance under various conditions, and the amount of noise. In the example described with reference to FIG. 4, the noise estimation unit 110 obtains, from the stored table, the relation between the luminance value of the applicable condition and the amount of noise, and outputs the amount of noise corresponding to the input luminance value to the pixel addition determination unit 116, the moving average addition determination unit 117, and the moving variance addition determination unit 118.

For example, as the exposure time period increases, random noise tends to increase. Furthermore, as the gain at which the image pickup signal is amplified increases, random noise tends to increase. Therefore, as the image-capturing conditions, information on the shutter speed and/or the gain is used, and a table of the pixel values and the amount of noise is generated and provided in correspondence with each of the shutter speed and/or the gain. Furthermore, the image-capturing mode provided in the imaging apparatus may also be used as an image-capturing condition. The image-capturing condition is set, for example, for each frame.

The noise estimation unit 110 receives, from the camera controller, as image-capturing condition information, the image-capturing mode, the shutter speed (exposure time period), the gain, and the like, which exert an influence upon the amount of noise in the image, obtains the relation between the luminance value and the amount of noise of the applicable conditions on the basis of the data of the relation between the luminance value and the amount of noise, which were measured in advance under various image-capturing conditions, and outputs the amount of noise corresponding to the input luminance value under applicable image-capturing conditions.

The noise determination table shows the amount of noise corresponding to this input luminance value. In the present embodiment, this noise determination table is generated by the noise determination table generator 512 shown in FIG. 21, as a table different according to the area condition of (a) motion estimation (ME) success area, (b) motion estimation (ME) failure area, and (c) detailed confirmation necessity area, and the noise determination table is provided to a noise estimation unit in the addition determination process execution unit 513 (having, for example, the same configuration as that of FIG. 4).

For example, in the addition determination process execution unit 513 having the same configuration as that of FIG. 4, the noise estimation unit receives, from the noise determination table generator 512 shown in FIG. 21, a different noise determination table in accordance with each of (a) motion estimation (ME) success area, (b) motion estimation (ME) failure area, and (c) detailed confirmation necessity area.

The noise estimation unit in the addition determination process execution unit 513 selects a table corresponding to an area in which a pixel that is input as an object for which processing is performed by the addition determination process execution unit 513, that is, a pixel for which an addition weight is computed, is contained, and obtains the relation between the pixel value (or the luminance value) and the amount of noise from the selected table. Thereafter, the information on the relation between the pixel value (or the luminance value) and the amount of noise is output to a pixel addition determination unit, a moving average addition determination unit, and a moving variance addition determination unit (see FIG. 4) in the addition determination process execution unit 513.

Each of these processing units performs a process in accordance with the amount of noise information supplied from the noise estimation unit. That is, the pixel addition determination unit, the moving average addition determination unit, and the moving variance addition determination unit (see FIG. 4) perform a process in which the estimated amount of noise different according to each of (a) motion estimation (ME) success area, (b) motion estimation (ME) failure area, and (c) detailed confirmation necessity area is used.

Figure 22:
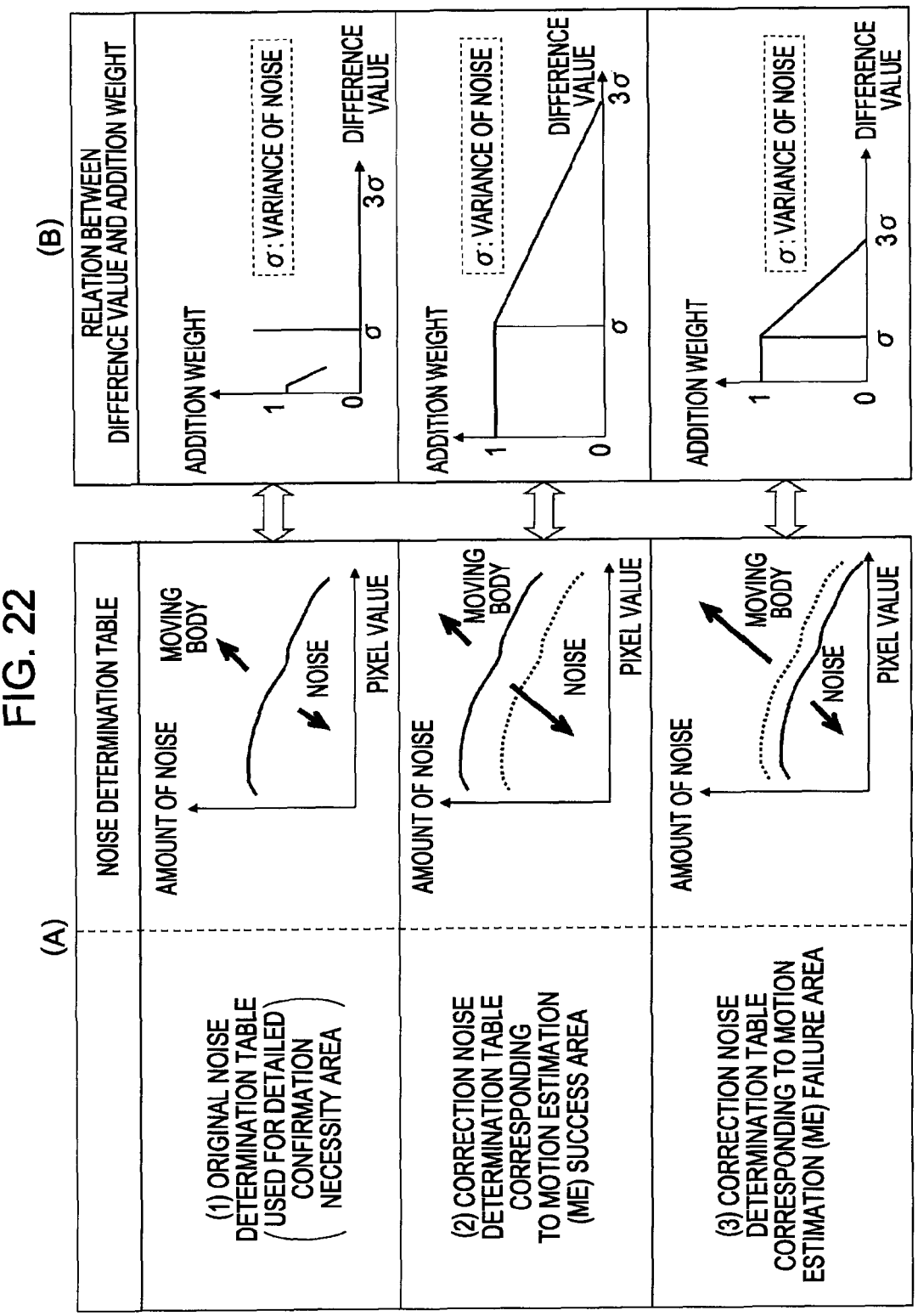
FIG. 22 illustrates specific examples of a noise determination table used by an addition determination unit in the image processing apparatus according to the third embodiment of the present invention.

A description will be given below, with reference to FIG. 22, of specific examples of noise determination tables. FIG. 22 shows three types of noise determination tables generated by the noise determination table generator 512. They are the following three types of noise determination tables:

(1) an original noise determination table (used for the detailed confirmation necessity area), (2) a correction noise determination table for the motion estimation (ME) success area, and (3) a correction noise determination table for the motion estimation (ME) failure area.

The noise determination table is a table in which estimated amounts of noise are determined in accordance with pixel values (or luminance values). The solid-line curve of the noise determination table shown in (1) the original noise determination table (used for the detailed confirmation necessity area) in part (A) of FIG. 22 shows a table in which the estimated amounts of noise are determined in accordance with basic pixel values (or luminance values). It is estimated that the lower the pixel value, the larger the noise components contained in the pixel value, and that the higher the pixel value, the smaller the noise components contained in the pixel value.

"(1) The original noise determination table" shown in the topmost area of FIG. 22 is a table used when the addition weight of the pixel contained in the area determined to be the "detailed confirmation necessity area" by the area determination unit 511 is to be computed.

"(2) The correction noise determination table for the motion estimation (ME) success area" is a table used when the addition weight of the pixel contained in the area determined to be the "motion estimation (ME) success area" by the area determination unit 511 is to be computed.

"(3) The correction noise determination table for the motion estimation (ME) failure area" is a table used when the addition weight of the pixel contained in the area determined to be the "motion estimation (ME) failure area" by the area determination unit 511 is to be computed.

As is understood from FIG. 22, for "(2) the correction noise determination table for the motion estimation (ME) success area", the estimated amounts of noise are set to be larger than that of "(1) original noise determination table". Furthermore, the estimated amounts of noise in "(3) motion estimation (ME) failure area corresponding correction noise determination table" are set to be smaller than that of "(1) original noise determination table".

By using such tables, the pixel addition determination unit, and the moving average addition determination unit, the moving variance addition determination unit (see FIG. 4) in the addition determination process execution unit 513 set an addition weight corresponding to each pixel, that is, the addition weight of the corresponding pixels of the corresponds to motion compensated image (MC image), which corresponds to the pixels of the current image. Part (B) of FIG. 22 shows the correspondence between a difference value between the corresponding pixels of the current image and the motion compensated image (MC image), and the addition weight. σ denotes the variance of noise.

In the pixel addition determination unit, the moving average addition determination unit, and the moving variance addition determination unit (see FIG. 4) in the addition determination process execution unit 513, since an estimated amount of noise different according to each of (a) motion estimation (ME) success area, (b) motion estimation (ME) failure area, and (c) detailed confirmation necessity area is used, an addition weight different according to each area is computed. More specifically, in the motion estimation (ME)

success area, many pixel values of the motion compensated image (MC image) are added, and the effect of noise removal increases. On the other hand, in the motion estimation (ME) failure area, many pixel values of the current image are added, and the effect of mobile body protection is increased.

(2c-2) Example of Configuration that Performs Process for Correcting Addition Weight in Accordance with Area Determination Result Next, a description will be given, with reference to FIG. 23, of an example of the configuration in which a process for correcting an addition weight in accordance with an area determination result is performed.

Figure 23:
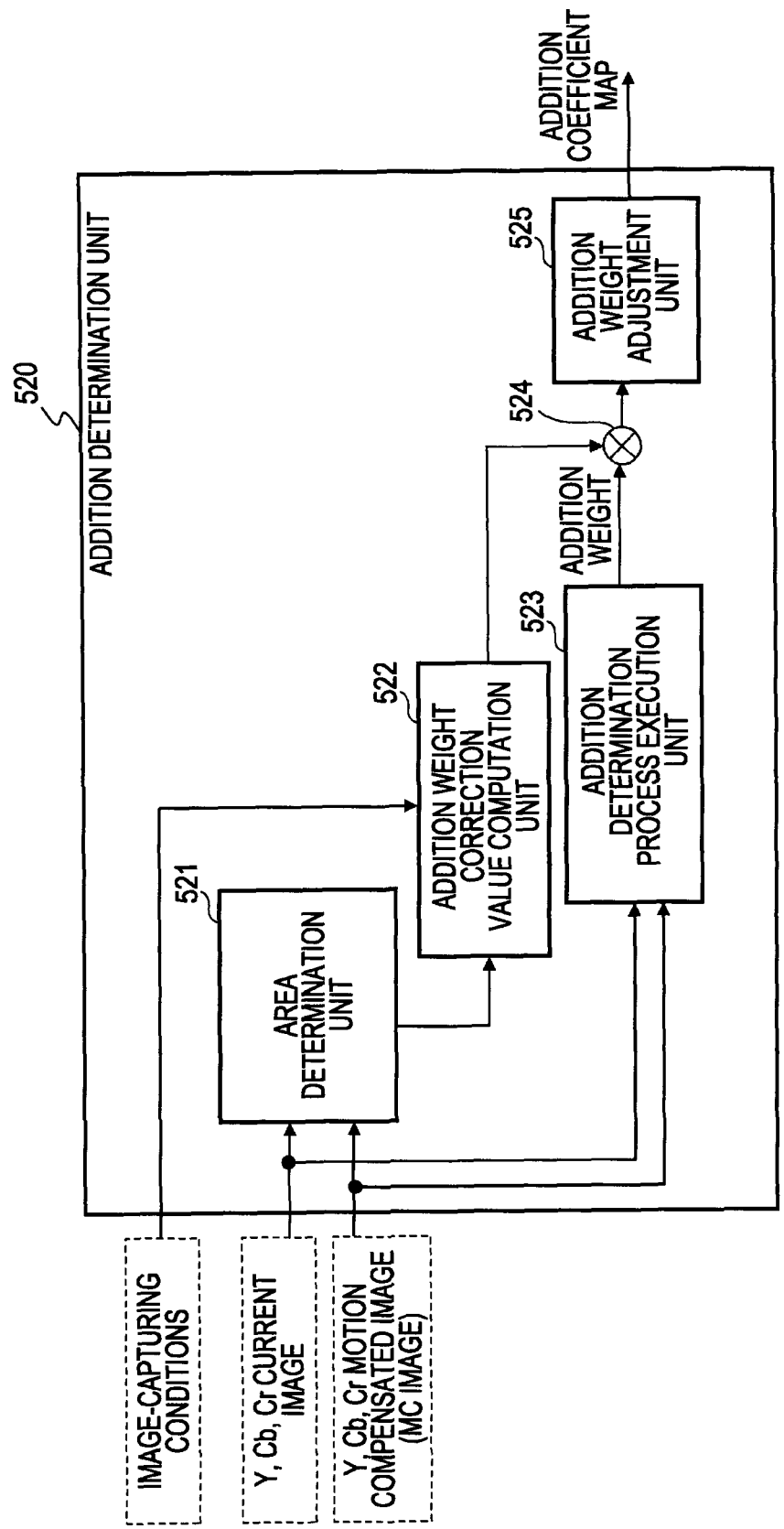
FIG. 23 illustrates the configuration of an addition determination unit in the image processing apparatus according to the third embodiment of the present invention and illustrates an example in which a process for correcting an addition weight in accordance with an area determination result is performed.

FIG. 23 shows another example of the configuration of the addition determination unit 500 in the image processing apparatus of the present third embodiment. An addition determination unit 520 can be used as the addition determination unit 14 of the image processing apparatus 10 shown in FIG. 1 or as the addition determination unit 304 of the image processing apparatus 300 shown in FIG. 9.

That is, the addition determination process to be described in the present third embodiment can be used as the process of the addition determination unit 14 of the image processing apparatus 10 shown in FIG. 1, in which a reduced image is not used, and can be used as the process of the addition determination unit 304 in the image processing apparatus 300 shown in FIG. 9, in which a reduced image is used.

In the following, a description will be given of a processing example in which the addition determination unit 520 is used as the addition determination unit 14 in the image processing apparatus 10 shown in FIG. 1. As shown in FIG. 21, the addition determination unit 520 includes an area determination unit 521, an addition weight correction value computation unit 522, an addition determination process execution unit 523, a computation unit 524, and an addition weight adjustment unit 525.

In a case where the addition determination unit 520 shown in FIG. 23 is used as the addition determination unit 14 of the image processing apparatus 10 shown in FIG. 1, a current image is input from the frame memory 11 to the addition determination unit 520, and a motion compensated image (MC image) is input from the motion compensation processor 13 to the addition determination unit 520. Furthermore, image information (image-capturing conditions, etc.) is input from, for example, a microcomputer inside a camera having the image processing apparatus 10. The image information is supplied from, for example, the microcomputer inside a camera. The image information contains information, such as the image-capturing mode, the exposure time period, and the gain, which corresponds to an input image (captured image).

The area determination unit 521 receives the current image stored in the frame memory 11 and the motion compensated image (MC image) generated by the motion compensation processor 13. In the area determination unit 521, the same area determination process as the process described earlier in the second embodiment is performed. That is, the area determination unit 521 has the same configuration as the area determination unit 351 in the addition determination unit 304 described with reference to FIG. 14, and performs the same processing. That is, the area determination unit 521 determines, in units of areas in which the current image and the motion compensated image (MC image) are divided, which one of (a) motion estimation (ME) success area, (b) motion estimation (ME) failure area, and (c) detailed confirmation necessity area each area belongs to, and outputs the determination result together with the position information on each area to the addition weight correction value computation unit 522.

The addition weight correction value computation unit 522 outputs the following addition weight correction values to the computation unit 524 in accordance with the area determination result from the area determination unit 521:

(a) a motion estimation (ME) success area: an addition weight correction value greater than 1, (b) a motion estimation (ME) failure area: an addition weight correction value smaller than 1, and (c) a detailed confirmation necessity area: 1.

The addition determination process execution unit 523 has the same configuration as, for example, the configuration of the addition determination unit described earlier with reference to FIG. 4, computes an addition weight corresponding to a pixel, and outputs the addition weight to the computation unit 524.

The computation unit 524 multiplies the addition weight output from the addition determination process execution unit 523 by the addition weight correction value output from the addition weight correction value computation unit 522 in the following manner:

(a) the motion estimation (ME) success area: the addition weight output from the addition determination process execution unit 523 is multiplied by an addition weight correction value greater than 1 so as to increase the addition weight (b) the motion estimation (ME) failure area: the addition weight output from the addition determination process execution unit 523 is multiplied by an addition weight correction value smaller than 1 so as to decrease the addition weight, and (c) the detailed confirmation necessity area: the addition weight output from the addition determination process execution unit 523 is multiplied by 1 so as not to change the addition weight.

Such correction of the addition weight is performed, and the correction result is output to the addition weight adjustment unit 525. In the addition weight adjustment unit 525, an addition weight adjustment process for normalizing the output value of the computation unit 524 so as to be in a range of 0 to 1 is performed, and this value is output as a final addition weight. Also, in a case where the configuration shown in FIG. 23 is used, the same advantages as those in the case described earlier with reference to FIG. 21 are obtained. That is, in the motion estimation (ME) success area, many pixel values of the motion compensated image (MC image) are added, and the effect of noise removal is increased. On the other hand, in the motion estimation (ME) failure area, many pixel values of the current image are added, and the effect of mobile body protection is increased.

(3) Example of Configuration of Hardware of Image Processing Apparatus

Figure 24:
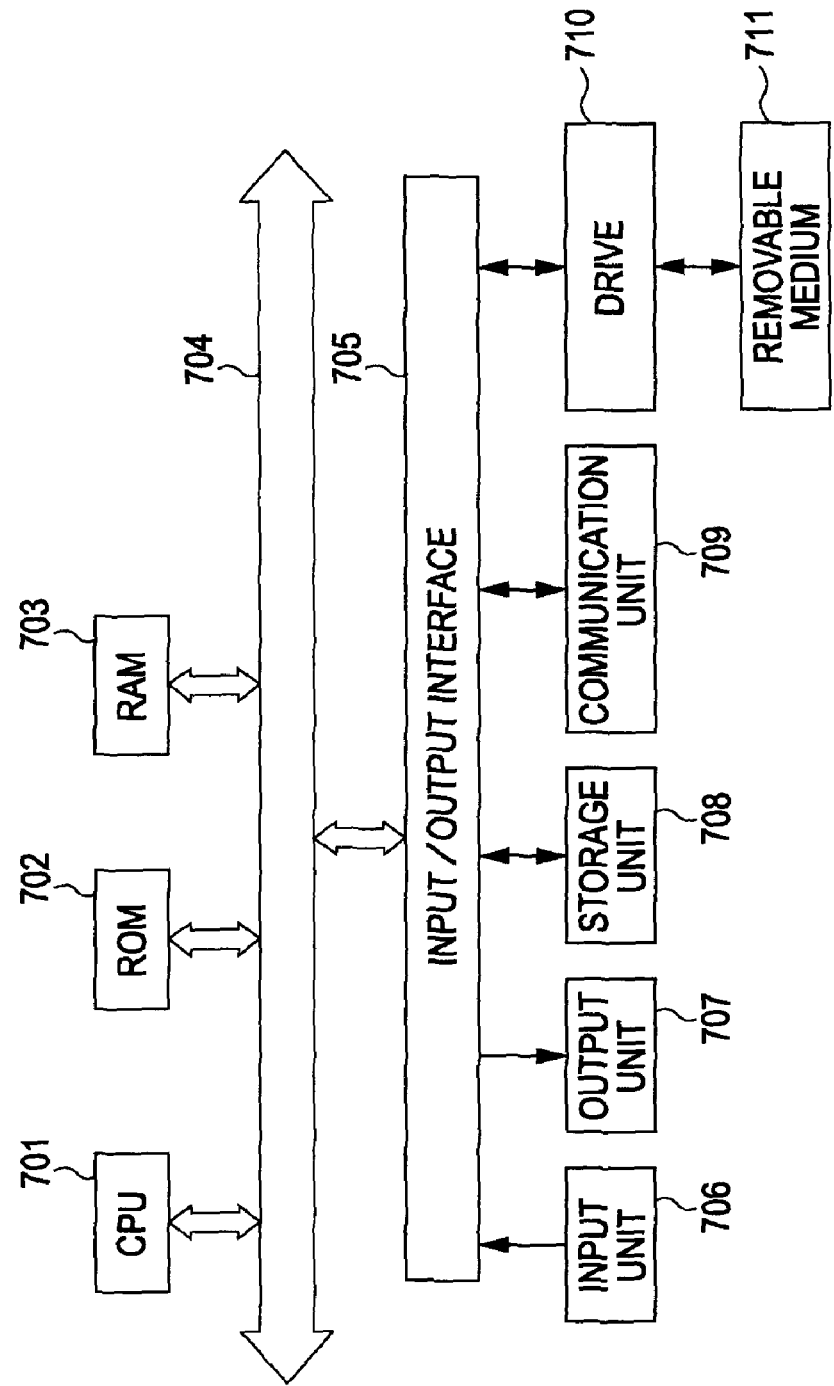
FIG. 24 illustrates an example of the configuration of hardware of an image processing apparatus according to an embodiment of the present invention.

Finally, a description will be given below, with reference to FIG. 24, of an example of the configuration of the hardware of a personal computer as one example of the hardware of an apparatus that performs the above-described processing. A CPU (Central Processing Unit) 701 performs various kinds of processing in accordance with a program stored in a ROM (Read Only Memory) 702 or a storage unit 708. For example, a processing program of a process for generating a noise reduced image (NR image), or the like, which is described in the above-mentioned embodiments, is executed. In a RAM (Random Access Memory) 703, a program to be executed by the CPU 701, data, and the like are stored as appropriate. The CPU 701, the ROM 702, and the RAM 703 are interconnected with one another through a bus 704.

The CPU 701 is connected to an input/output interface 705 via the bus 704. An input unit 706 including a keyboard, a mouse, a microphone, and the like, and an output unit 707 including a display panel, a speaker, and the like are connected to the input/output interface 705. The CPU 701 executes various kinds of processing in response to an instruction input from the input unit 706, and outputs the processing result to, for example, the output unit 707.

The storage unit 708 connected to the input/output interface 705 is formed of, for example, a hard disk, and stores programs to be executed by the CPU 701, and various kinds of data. A communication unit 709 communicates with external devices via a network, such as the Internet or a local area network.

A drive 710 connected to the input/output interface 705 drives a removable medium 711, such as a magnetic disk, an optical disc, a magneto-optical disc, or a semiconductor memory so as to obtain recorded programs, data, and the like. The obtained programs and data are transferred to the storage unit 708 as necessary and are stored therein.

The present invention has been described above in detail while referring to specific embodiments. However, it is obvious that modifications and substitutions of the embodiments can be made within the spirit and scope of the present invention. That is, the present invention has been disclosed as exemplary embodiments, and should not be construed as being limited. In order to determine the gist of the present invention, the claims should be taken into consideration.

Note that the series of processes described in the specification can be executed by hardware, software, or a combination of both. In the case where the series of processes is to be performed by software, a program recording the processing sequence may be installed in a memory in a computer embedded in dedicated hardware and executed. Alternatively, the program may be installed on a general-purpose computer capable of performing various processes and executed. For example, the program may be recorded on a recording medium. Note that, besides installing the program from the recording medium to a computer, the program may be installed on a recording medium such as an internal hard disk via a network such as a LAN (Local Area Network) or the Internet.

Note that the various processes described in the specification are not necessarily performed sequentially in the orders described, and may be performed in parallel or individually in accordance with the processing performance or necessity of an apparatus that performs the processes. In addition, the system in the present specification refers to a logical assembly of a plurality of apparatuses and is not limited to an assembly in which apparatuses having individual structures are contained in a single housing.

The present application contains subject matter related to that disclosed in Japanese Priority Patent Application JP 2008-325422 filed in the Japan Patent Office on Dec. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
 a motion prediction processor configured to detect a motion vector that indicates inter-image motion between a current image and a reference image;
 a motion compensation processor configured to perform a motion compensation process for the reference image by using the motion vector and generate a motion compensated image;
 an addition processor configured to generate a noise reduced image in which noise of the current image is reduced by performing a process for adding the current image and the motion compensated image;
 an addition determination unit configured to compute an addition weight in units of pixels of the motion compensated image that is used for a process for adding the current image and the motion compensated image, the addition process being performed by the addition processor;
 a down-sampling processor configured to perform a process for reducing the current image and the motion compensated image that are input to the addition determination unit; and
 an up-sampling processor configured to perform a process for expanding an addition coefficient map that is an output of the addition determination unit.

2. The image processing apparatus according to claim 1, wherein, by using reduced images of the current image and the motion compensated image generated by the down-sampling processor, the addition determination unit computes an addition weight corresponding to constituent pixels of the reduced image.

3. An image processing method for use with an image processing apparatus configured to generate a noise reduced image, the image processing method comprising the steps of:
 detecting, by using a motion prediction processor, a motion vector that indicates inter-image motion between a current image and a reference image;
 performing, by using a motion compensation processor, a motion compensation process for the reference image by using the motion vector and generating a motion compensated image;
 generating, by using an addition processor, a noise reduced image in which noise of the current image is reduced by performing a process for adding the current image and the motion compensated image;
 computing, by using an addition determination unit, an addition weight in units of pixels of the motion compensated image that is used for a process for adding the current image and the motion compensated image, the addition process being performed by the addition processor;
 performing, by using a down-sampling processor, a process for reducing the current image and the motion compensated image that are input to the addition determination unit; and
 performing, by using an up-sampling processor, a process for expanding an addition coefficient map that is an output of the addition determination unit.

4. A non-transitory computer-readable medium encoded with a program for causing an image processing apparatus to execute image processing comprising the steps of:
 causing a motion prediction processor to detect a motion vector that indicates inter-image motion between a current image and a reference image;
 causing a motion compensation processor to perform a motion compensation process for the reference image by using the motion vector and generate a motion compensated image;
 causing an addition processor to generate a noise reduced image in which noise of the current image is reduced by performing a process for adding the current image and the motion compensated image;
 causing an addition determination unit to compute an addition weight in units of pixels of the motion compensated image that is used for a process for adding the current image and the motion compensated image, the addition process being performed by the addition processor;
causing a down-sampling processor to perform a process for reducing the current image and the motion compensated image that are input to the addition determination unit; and
causing an up-sampling processor to perform a process for expanding an addition coefficient map that is an output of the addition determination unit.

\* \* \* \* \*